(12) United States Patent
Rawat et al.

(10) Patent No.: US 12,250,617 B2
(45) Date of Patent: Mar. 11, 2025

(54) AUTONOMOUS VEHICLE COMMUNICATION FRAMEWORK FOR MULTI-NETWORK SCENARIOS

(71) Applicant: Intel Corporation, Santa Clara, CA (US)

(72) Inventors: Anish Rawat, Karlsruhe (DE); Dario Sabella, Gassino (IT)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 17/851,907

(22) Filed: Jun. 28, 2022

(65) Prior Publication Data

US 2022/0329993 A1  Oct. 13, 2022

Related U.S. Application Data

(60) Provisional application No. 63/246,276, filed on Sep. 20, 2021.

(51) Int. Cl.
| | |
|---|---|
| *H04W 4/40* | (2018.01) |
| *H04H 20/62* | (2008.01) |
| *H04W 4/50* | (2018.01) |
| *H04W 76/10* | (2018.01) |
| *H04W 84/00* | (2009.01) |

(52) U.S. Cl.
CPC .............. *H04W 4/40* (2018.02); *H04H 20/62* (2013.01); *H04W 4/50* (2018.02); *H04W 76/10* (2018.02); *H04W 84/005* (2013.01)

(58) Field of Classification Search
CPC ...................................................... H04W 4/40
See application file for complete search history.

(56) References Cited

U.S. PATENT DOCUMENTS

| | | | |
|---|---|---|---|
| 2018/0255508 A1* | 9/2018 | Lopes | H04W 4/40 |
| 2019/0197795 A1* | 6/2019 | Mondello | G01C 21/34 |
| 2020/0084193 A1* | 3/2020 | Beaurepaire | G05D 1/0287 |

OTHER PUBLICATIONS

"Automotive revolution-perspective towards 2030 How the convergence of disruptive technology-driven trends could transform the auto industry", MckinseyandCompany, (Jan. 2016), 20 pgs.
"Simultaneous localization and mapping", [Online]. Retrieved from the Internet: URL: https: en.wikipedia.org wikiSimultaneous_localization_and_mapping, ( Accessed on Oct. 17, 2021), 11 pgs.

(Continued)

*Primary Examiner* — Hsinchun Liao
(74) *Attorney, Agent, or Firm* — Schwegman Lundberg & Woessner, P.A.

(57) ABSTRACT

Approaches for Multi-Access Edge Computing (MEC) Vehicle-to-Everything (V2X), Vehicle-To-Vehicle (V2V), and Autonomous Vehicles Distributed Networks (AVDN) functions in a MEC infrastructure are discussed. In various examples, operations and network configurations are described that use a service in an AVDN, including: identifying a service condition (e.g., based on a state of a service and connectivity to an instance of the service); establishing a connection in the AVDN in response to the service condition (e.g., using vehicle-to-vehicle (V2V) or Vehicle-to-Everything (V2X) network communications to the AVDN); and performing a service operation with the service via the AVDN.

25 Claims, 22 Drawing Sheets

(56) References Cited

OTHER PUBLICATIONS

"Multi-access Edge Computing (MEC); MEC in resource constrained terminals, fixed or mobile", [Online]. Retrieved from the Internet: URL: https: portal.etsi.org webapp WorkProgram Report_WorkItem.asp?WKI_ID=59467 , 2 pgs.
Dai, Yueyue, "Joint load balancing and offloading in vehicular edge computing and networks", IEEE Internet of Things Journal vol. 6, Issue: 3, (Jun. 2019), pp. 4377-4387.
Heinrich, S, "Flash memory in the emerging age of autonomy", Lucid Motors Proc. Flash Memory Summit, Santa Clara, CA, (Aug. 2017), pp. 1-10.
Johnson, D B, "DSR: the dynamic source routing protocol for multihop wireless ad hoc networks", Ad hoc networking, (Dec. 2000), pp. 139-172.
Kianfar, Roozbeh, "Design and Experimental Validation of a Cooperative Driving System in the Grand Cooperative Driving Challenge", IEEE Transactions on Intelligent Transportation Systems vol. 13, Issue 3, (Sep. 2012), 14 pgs.
Kim, Chansoo, "Crowd-Sourced Mapping of New Feature Layer for High-Definition Map", Sensors 18, 4172, (Nov. 28, 2018), 17 pgs.
Kim, Seong-Woo, "The Impact of Cooperative Perception on Decision Making and Planning of Autonomous Vehicles", IEEE Intelligent Transportation Systems Magazine ( vol. 7, Issue: 3, (2015), 12 pgs.
Krzanich, Brian, "Data is the New Oil in the Future of Automated Driving", [Online]. Retrieved from the Internet: URL: https: newsroom.intel.com editorials krzanich-the-future-of-automated-driving #gs.6wkhpk, (Nov. 15, 2016), 5 pgs.
Lin, Shih-Chieh, "The Architectural Implications of Autonomous Driving: Constraints and Acceleration", ASPLOS '18: Proceedings of the Twenty-Third International Conference on Architectural Support for Programming Languages and Operating Systems, (2018), 16 pgs.
Liu, S, "Towards Fully Intelligent Transportation through Infrastructure-Vehicle Cooperative Autonomous Driving: Challenges and Opportunities", arXiv:2013.02176v1, (Mar. 3, 2021), 5 pgs.
Liu, Yujiong, "A computation offloading algorithm based on game theory for vehicular edge networks", 2018 IEEE International Conference on Communications (ICC), (May 2018), 6 pgs.
Lu, N, "Connected vehicles: Solutions and challenges", IEEE Internet Things J., vol. 1, No. 4, (Aug. 2014), pp. 289-299.
Mao, Yuyi, "Stochastic joint radio and computational resource management for multi-user mobile-edge computing systems", IEEE Transactions on Wireless Communications vol. 16, Issue: 9, (Sep. 2017), 16 pgs.
Perkins, C E, "Ad-hoc on-demand distance vector routing", Proceedings of the 2nd IEEE Workshop on Mobile Computing Systems and Applications (WMCSA), (1999), pp. 90-100.
Pfingsthorn, M, "A scalable hybrid multi-robot SLAM method for highly detailed maps", in Proc. RoboCup, (2007), 9 pgs.
Richart, Daniel, "Autonomous Cars' Big Problem: The energy consumption of edge processing reduces a car's mileage with up to 30%.", Teraki [Online]. Retrieved from the Internet: URL: https: medium.com @teraki energy-consumption-required-by-edge-computing-reduces-a-autonomous-cars-mileage-with-up-to-30-46b6764ea1b7, (May 15, 2019), 9 pgs.
Siegel, J E, "A survey of the connected vehicle landscape-architectures, enabling technologies, applications, and development areas", IEEE Trans. Intell. Transp. Syst., vol. 19, No. 8, (Aug. 2018), pp. 2391-2406.
Su, Z, "D2D-based content delivery with parked vehicles in vehicular social networks", IEEE Wireless Commun., vol. 23, No. 4, (Aug. 2016), pp. 90-95.
Tseng, Lewis, "When Cars Meet Distributed Computing: Data Storage as an Example", arXiv:1711.02014v1, (Nov. 6, 2017), 3 pgs.
Vidal-Calleja, T A, "Large scale multiple robot visual mapping with heterogeneous landmarks in semi-structured terrain", Robot. Auton. Syst., vol. 59, No. 9, (Sep. 2011), pp. 654-674.
Vigneri, L, "Low cost video streaming through mobile edge caching: Modelling and optimization", IEEE Trans. Mobile Comput., vol. 18, No. 6, (Jun. 2019), 14 pgs.
Wang, Z, "Vehicle-based cloudlet relaying for mobile computation offloading", IEEE Trans. Veh. Technol., vol. 67, No. 11, (Nov. 2019), 11 pgs.
Williams, S B, "Towards multi-vehicle simultaneous localisation and mapping", Proceedings 2002 IEEE International Conference on Robotics and Automation, (May 2002), 6 pgs.
You, Changsheng, "Energy-efficient resource allocation for mobile-edge computation offloading", IEEE Trans. Wireless Commun., vol. 16, No. 3, (Aug. 2018), pp. 2391-2406.
Yu, YT, "Scalable VANET content routing using hierarchical bloom filters", Sanadidi—Wireless Communications and Mobile Computing, (2015).
Zhang, Y, "A mobilityaware vehicular caching scheme in content centric networks: Model and optimization", IEEE Trans. Veh. Technol, (2019), 13 pgs.

* cited by examiner

AUTONOMOUS VEHICLE COMMUNICATION FRAMEWORK FOR MULTI-NETWORK SCENARIOS

PRIORITY CLAIM

This application claims the benefit of priority to U.S. Provisional Patent Application No. 63/246,276, filed Sep. 20, 2021, and titled "MEC-BASED INTELLIGENT FRAMEWORK FOR AUTONOMOUS VEHICLES IN MULTI-MOBILE NETWORK OPERATOR SCENARIOS", which is incorporated herein by reference in its entirety.

TECHNICAL FIELD

Embodiments described herein generally relate to data processing, network communication, and communication system implementations, and in particular, to techniques and configurations for Autonomous Vehicle Distributed Networks (AVDNs), in network settings such as a multi-access edge computing (MEC) infrastructures and in Multi-MNO (mobile network operator) scenarios.

BACKGROUND

Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

Once technological and regulatory issues will be resolved, up to 15 percent of newly sold cars sold in 2030 could be fully autonomous (with total numbers expected in millions). There are many technical issues and open gaps in the area of autonomous vehicles, especially in environments involving multiple automakers and suppliers (and in presence of many unregulated systems). These technical issues often are related vehicle resources. In fact, for each autonomous car running, connectivity, bandwidth, and power are finite resources that must be expertly traversed alongside a cost-of-ownership. In each autonomous car, many forms of (expensive) data are expected to be generated and consumed, which in turn will produce constraints related to data usage, power and energy usage, and materials costs.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for providing a MEC-based intelligent framework for autonomous vehicles in Multi-MNO scenarios. In a vehicle-to-everything (V2X) scenario with autonomous vehicles connected in a network with different technologies, technical problems occur when each vehicle is in need of consuming computational services, or offering task offloading capabilities, or coordinating with the other vehicles to perform some joint action. Among other technical problems and considerations, the following framework addresses: how to provide an abstracted connectivity layer to enable cost and energy savings via computation and resource sharing among the vehicles of an AVDN; how to ensure interoperability among different original equipment manufacturers (OEMs), MNOs, and vendors in such a scenario; and, how to ensure service continuity and availability of the AVDN services, by exploiting the MEC infrastructure in the system.

Based on this scenario, a hierarchical framework of the following components is established:

A collaborative network of vehicles, referred to herein as an "AVDN (Autonomous Vehicle Distributed Network)", enabling consumption and production of services, where vehicles can authenticate and take part in the network, as SP (service provider) or SR (service requestor).

The introduction of "anchor" vehicles in this AVDN, e.g., MEC-enabled vehicles that can act as SPs and support vehicles who are not directly connected to a MEC system or just some MEC Services. Such vehicles may become anchor vehicles for any reason, such as when the AVs is out-of-coverage, or under different networks, or connected with different systems. Such MEC-enabled vehicles may be referred to as "Anchor-SPs" in the AVDN.

A communication protocol and mechanism, after the establishment of the AVDN network, to allow all the vehicles to exchange information on their resources and computation capabilities. This protocol may also offer or consume services as appropriate while communicating via PC5 or Uu links (in addition to other access technologies).

An API abstraction layer enabling the execution of optimization algorithms that can lead to actions within the AVDN. Such an abstraction layer may enable cost reduction/sharing/optimization, and can be achieved both at vehicle level and the AVDN (e.g., based on the chosen policy).

Figure 1A:
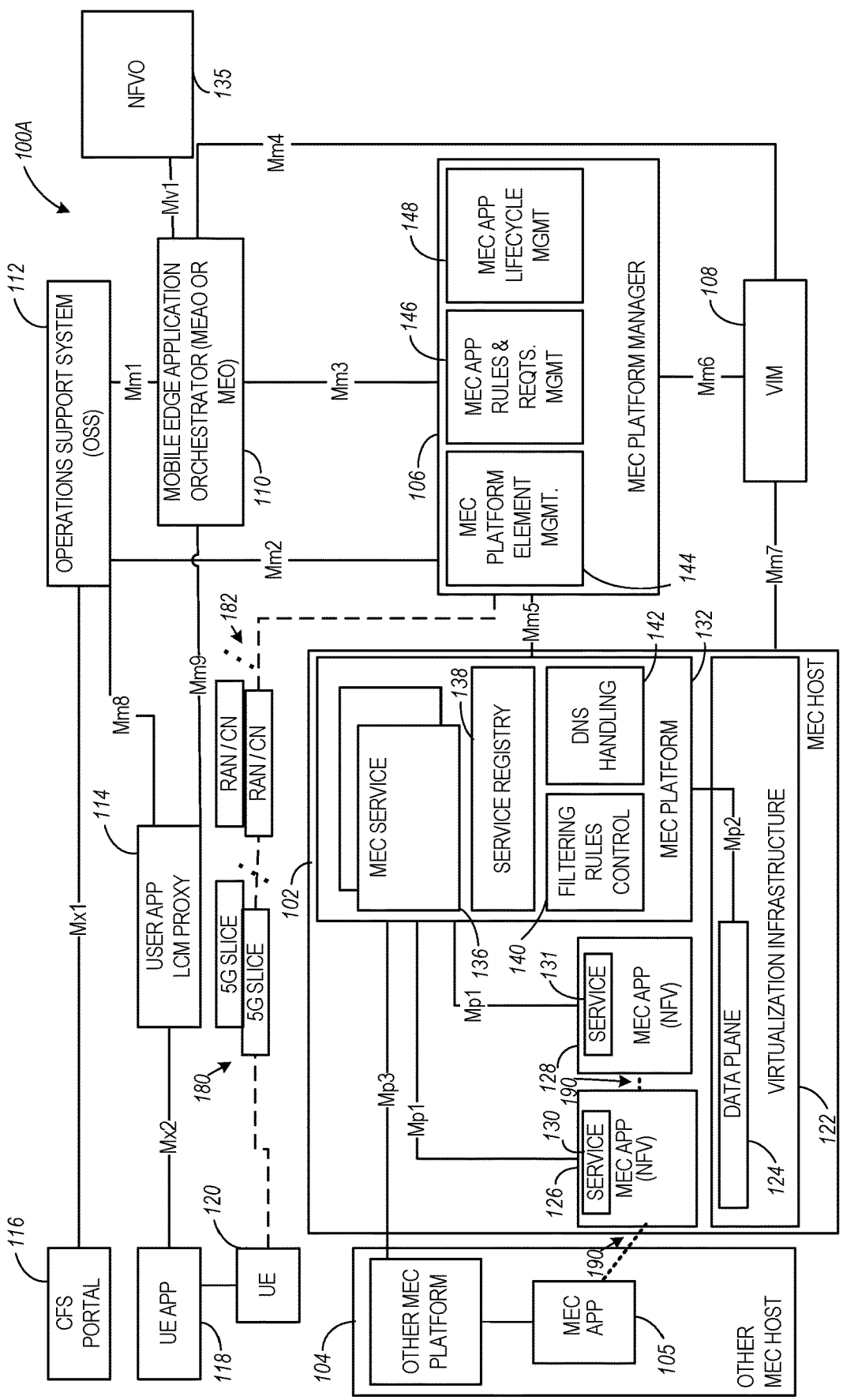
FIG. 1A illustrates a MEC network architecture that can implement MEC V2X and AVDN functions in a MEC infrastructure, according to an example.

FIG. 1A illustrates a MEC network architecture used for implementing the present techniques, according to an example. FIG. 1A specifically illustrates a MEC architecture 100A with MEC hosts 102 and 104 providing functionalities per one or more ETSI MEC specifications (e.g., ETSI GS MEC 003, ETSI GS MEC 011, and ETSI GS MEC 030 specifications). Specifically, the MEC platform 132, V2X message signaling, APIs, and other aspects, can be used for implementing MEC V2X and AVDN functions within the MEC architecture 100A. In particular, the MEC V2X and AVDN functions discussed below may be related to ETSI MEC standards (e.g., ETSI GR MEC 036 or derivatives thereof) related to the definition of the technical requirements to enable constrained devices or connected mobile hosts and terminals.

Referring to FIG. 1A, the MEC architecture 100A includes MEC hosts 102 and 104, a virtualization infrastructure manager (VIM) 108, a MEC platform manager 106 (also referred to as Mobile Edge Platform Manager or MEPM), a Mobile Edge Application Orchestrator (MEAO) (also referred to as a MEC orchestrator or MEO) 110, an operations support system (OSS) 112, a user app proxy 114, a UE app 118 running on UE 120, and CFS portal 116. The MEC host 102 can include a MEC platform 132 with filtering rules control module 140, a DNS handling module 142, service registry 138, and MEC services 136. The MEC host 104 can include resources used to instantiate MEC apps 105. The MEC services 136 can include at least one scheduler 137, which can be used to select resources for instantiating MEC apps (or NFVs) 126 and 128 upon virtualization infrastructure 122 that includes a data plane 124.

The MEC apps 126 and 128 can be configured to provide services 130/131, which can include processing network communications traffic of different types associated with one or more wireless connections. In some embodiments, the services 130/131 include message broker services configured to support multiple application layer protocols used in the collection/distribution of data from/to multiple data sources across different MNOs. In this regard, services 130/131 provided by MEC apps are also referred to as V2X message brokers. In other embodiments, MEC apps 126 and 128 are used for V2X message subscription (e.g., to subscribe to V2X communications from V2X message brokers) and V2X message publication (e.g., to publish data to V2X message brokers which can be distributed to V2X message subscribers).

In some embodiments, a first MEC app (e.g., MEC app 105 in MEC host 104) can be configured as a V2X message broker, while a second MEC app (e.g., MEC app 126 in MEC host 102) can be configured as a MEC V2X message service subscriber/consumer. In this case, a communication link (e.g., a direct data connection) 190 may be established between two separate MEC apps (e.g., MEC apps in different MEC hosts or the same MEC host). In this regard, the V2X message broker is a service-producing MEC app.

In other aspects, the V2X message broker may be configured as a registered service of the MEC platform 132, as a producer of data. In other words, the message broker is part of a MEC platform's service registry. In this case, communication with a MEC app requesting a subscription to a V2X messaging service is achieved, within the same MEC host, via the Mp1 interface and the connection to a common MEC platform. When the message broker service and the requestor MEC app are instantiated at different MEC hosts of the same MEC system, communication with a MEC app in another MEC host (in the same or different MNO) is achieved via the Mp3 interface (e.g., using a connection between MEC platforms in different MEC hosts). In case these different MEC hosts belong to different MEC systems of a MEC federation, then, instead of Mp3, MEC federation reference points are involved in this communication.

In some aspects, the message broker is a service-producing MEC application, either instantiated at the same MEC host as the MEC app requesting subscription to V2X messages, or at another MEC host of the same or of another MEC system. In case of different locality (e.g., different MEC hosts), the Mp1 and Mp3/MEC federation interfaces are involved in communication. In case of the same locality (e.g., the same MEC host), the Mp1 interface will be only involved.

The MEC platform manager 106 can include MEC platform element management module 144, MEC app rules and requirements management module 146, and MEC app lifecycle management module 148.

In some aspects, UE 120 can be configured to communicate to one or more of the core networks 182 via one or more of the network slice instances (NSIs) 180. In some aspects, the core networks 182 can use slice management functions to dynamically configure NSIs 180, including dynamically assign a slice to a UE, configure network functions associated with the slice, configure a MEC app for communicating data using the slice, reassign a slice to a UE, dynamically allocate or reallocate resources used by one or more of the NSIs 180, or other slice related management functions. One or more of the functions performed in connection with slice management can be initiated based on user requests (e.g., via a UE), based on a request by a service provider, or maybe triggered automatically in connection with an existing Service Level Agreement (SLA) specifying slice-related performance objectives.

Figure 1B:
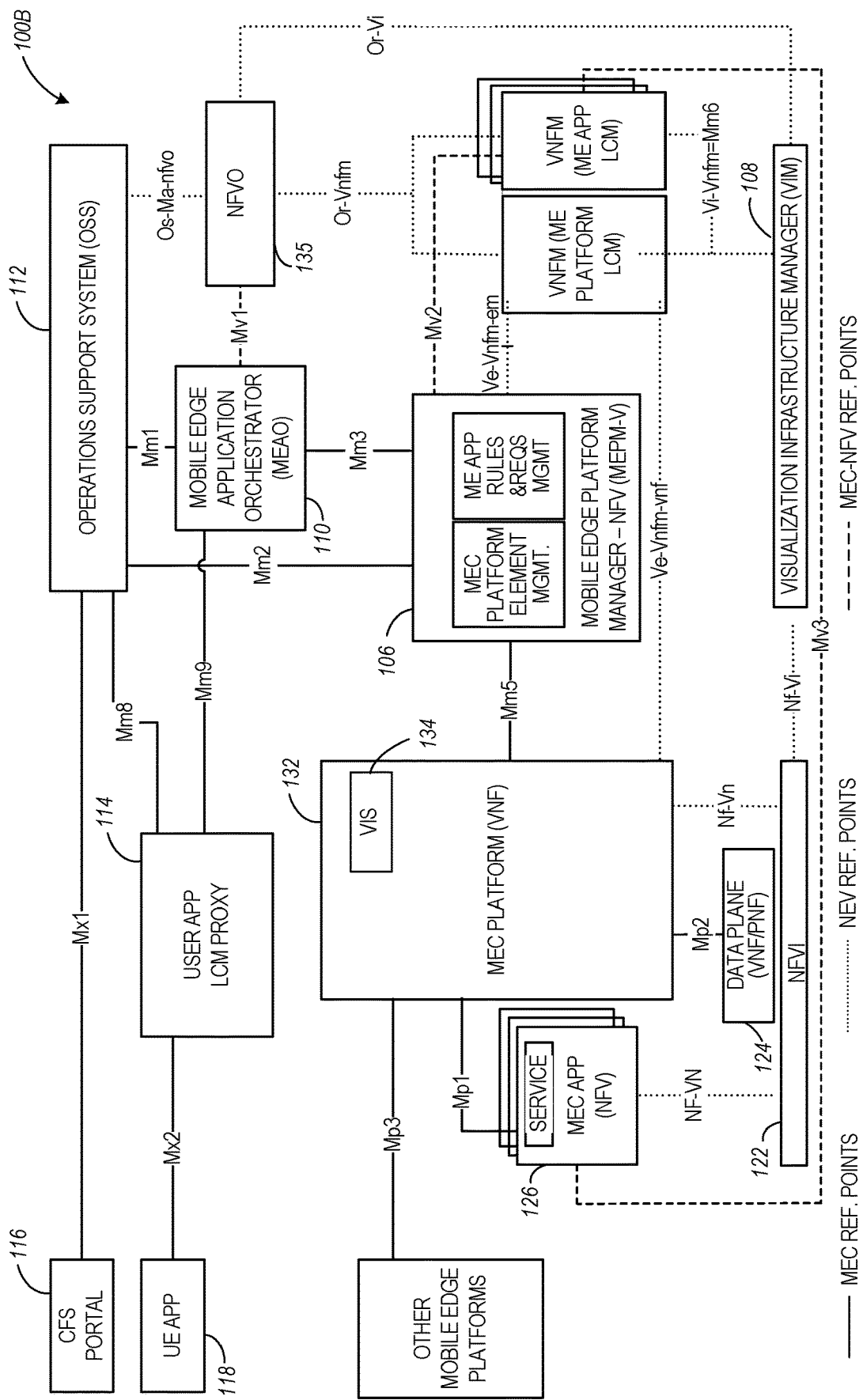
FIG. 1B illustrates a MEC reference architecture in a Network Function Virtualization (NFV) environment, according to an example.

FIG. 1B illustrates a MEC reference architecture 100B in a Network Function Virtualization (NFV) environment, according to an example. The MEC architecture 100B can be configured to provide functionalities according to an ETSI MEC specification, such as the ETSI GR MEC 017 specification.

In some aspects, ETSI MEC can be deployed in an NFV environment as illustrated in FIG. 1B which can also implement MEC V2X and AVDN functions in a MEC infrastructure, as discussed herein. In some aspects, the MEC platform is deployed as a virtualized network function (VNF). The MEC applications can appear like VNFs towards the ETSI NFV Management and Orchestration (MANO) components (e.g., VIM 108, MEAO 110, and NFVO 135). This allows the re-use of ETSI NFV MANO functionality. In some aspects, the full set of MANO functionality may be unused and certain additional functionality may be needed. Such a specific MEC application is denoted by the name "MEC app VNF" (or ME app VNF) as discussed herein. In some aspects, the virtualization infrastructure is deployed as an NFVI and its virtualized resources are managed by the virtualized infrastructure manager (VIM). For that purpose, one or more of the procedures defined by ETSI NFV Infrastructure specifications (e.g., ETSI GS NFV-INF 003, ETSI GS NFV-INF 004, and ETSI GS NFV-INF 005) can be used.

In some aspects, the MEC app VNFs will be managed like individual VNFs, allowing that a MEC-in-NFV deployment can delegate certain orchestration and Life Cycle Management (LCM) tasks to the NFVO and VNFM functional blocks, as defined by ETSI NFV MANO. In some embodiments, the MEC app VNF can be configured as a V2X message broker or as a V2X app that consumes V2X services in a MEC architecture (e.g., V2X message subscription services provided by V2X message brokers from different MNOs).

In some aspects, the Mobile Edge Platform Manager (MEPM) 106 can be transformed into a "Mobile Edge Platform Manager-NFV" (MEPM-V) that delegates the LCM part to one or more virtual network function managers (VNFM(s)). The Mobile Edge Orchestrator (MEO), as defined in the MEC reference architecture ETSI GS MEC-003, can be transformed into a "Mobile Edge Application Orchestrator" (MEAO) 110 that uses the NFVO 135 for resource orchestration, and orchestration of the set of MEC app VNFs as one or more NFV Network Services (NSs). In some embodiments, the MEAO 110 and the MEPM 106 can be configured to perform federation management functions, including communication between MEC systems in a federated MEC network.

In some aspects, the Mobile Edge Platform VNF, the MEPM-V, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between a MEC application and the ME platform can be optional for the MEC application, unless it is an application that provides and/or consumes a ME service. Various MEC-related interfaces and reference points discussed herein may be further defined in the ETSI-related technical specifications (e.g., ETSI GS MEC-003 and ETSI GR MEC-024 specifications).

The Mp1 reference point is a reference point between the mobile edge platform and the mobile edge applications. The Mp1 reference point provides service registration, service discovery, and communication support for services. It also provides other functionality such as application availability, session state relocation support procedures, traffic rules, and DNS rules activation, access to persistent storage and time of day information, etc. This reference point can be used for consuming and providing service-specific functionality.

The Mp2 reference point is a reference point between the mobile edge platform and the data plane of the virtualization infrastructure. The Mp2 reference point is used to instruct the data plane on how to route traffic among applications, networks, services, etc.

The Mp3 reference point is a reference point between mobile edge platforms and it is used for control communication between mobile edge platforms.

In some aspects, the Mm3 reference point between the MEAO 110 and the MEPM-V 106 is based on the Mm3 reference point, as defined by ETSI GS MEC 003. Changes may be configured to this reference point to cater to the split between MEPM-V and VNFM (MEC applications LCM).

In some aspects, the following new reference points (Mv1, Mv2, and Mv3) are introduced between elements of the ETSI MEC architecture and the ETSI NFV architecture to support the management of MEC app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the MEC app VNFs with the MEPM-V to allow LCM related notifications to be exchanged between these entities; it is related to the Ve- Vnfm-em reference point as defined in ETSI NFV, but may include additions, and might not use all functionality offered by Ve-Vnfm-em); Mv3 (this reference point connects the VNF Manager with the MEC app VNF instance, to allow the exchange of messages e.g. related to MEC application LCM or initial deployment-specific configuration; it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each MEC app VNF with the NFVI); Nf-Vi (this reference point connects the NFVI and the VIM); Os-Ma-nfvo (this reference point connects the OSS and the NFVO. It is primarily used to manage NSs, i.e. several VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Many real-life scenarios of MEC and V2X (similar to Smart City scenarios and use cases) are characterized by the presence of multiple car OEMs, implying also multi-MNO networks and multi-MEC systems, and also heterogeneous access networks, with the additional complication of temporary lack of network connectivity. Thus, the following constraints may be experienced in MEC and V2X settings:

Data Usage Constraints: caused by expensive data from Network providers and CSPs (computational power usage). Additionally, Future Updates in technology (E.g. Maps getting richer) will need more data—therefore multiple times Cost increase in the Future.

Power/Energy Usage Constraints: The total power consumption of the autonomous driving system includes the consumption of the computing system, storage overhead, and cooling overhead.

Bill of Materials (BOM) Price: Cost of sensors, Cost of the Multicore SoCs, accelerators (like GPU, FPGA, and ASICs) and storage.

Multiple Car OEMs (including both conventional Car manufacturers and new autonomous vehicles 'developers') are, in general, working with different partners on developing autonomous vehicles based on different standards and technologies. Such OEMs may also connect their vehicles to different MNOs networks (equipped with their MEC infrastructures). Therefore there is a need for solutions helping in communications/networking between autonomous vehicles, allowing interoperability in this multi-OEM scenario.

Such scenarios are complicated by heterogeneous access networks. Cars are not only connected via cellular networks but may have in principle different communication capabilities, e.g., DSRC, Wi-Fi, 4G/LTE, 5G, etc., with each of the communication mechanisms having different characteristics. In a realistic scenario, different cars may also utilize different network connectivity means.

Furthermore, due to vehicles mobility, some of them can be even temporarily outside of any network connection, but still in need of service continuity, from a communication point of view. In this scenario, how to use the various communication means efficiently for a certain service is an open problem.

In such scenarios of heterogeneous V2X communications, service providers are in the need of offering advanced mobility services to both vertical market segment players, Smart City municipalities, and citizens, also via collaboration with third parties and system integrators. Then, as a consequence of this level of complexity, scaling a common architecture across the autonomous vehicles, networks, cloud, and edge saves time and resources and further helps the development of this ecosystem of new services, by meeting dynamic real-time latency requirements for the smooth working of autonomous vehicles. Finally, due to the key role of MEC in such heterogeneous scenarios, a comprehensive solution should allow all cars to exploit network and MEC resources, ensure service continuity, and support the saving of resources.

Figure 2:
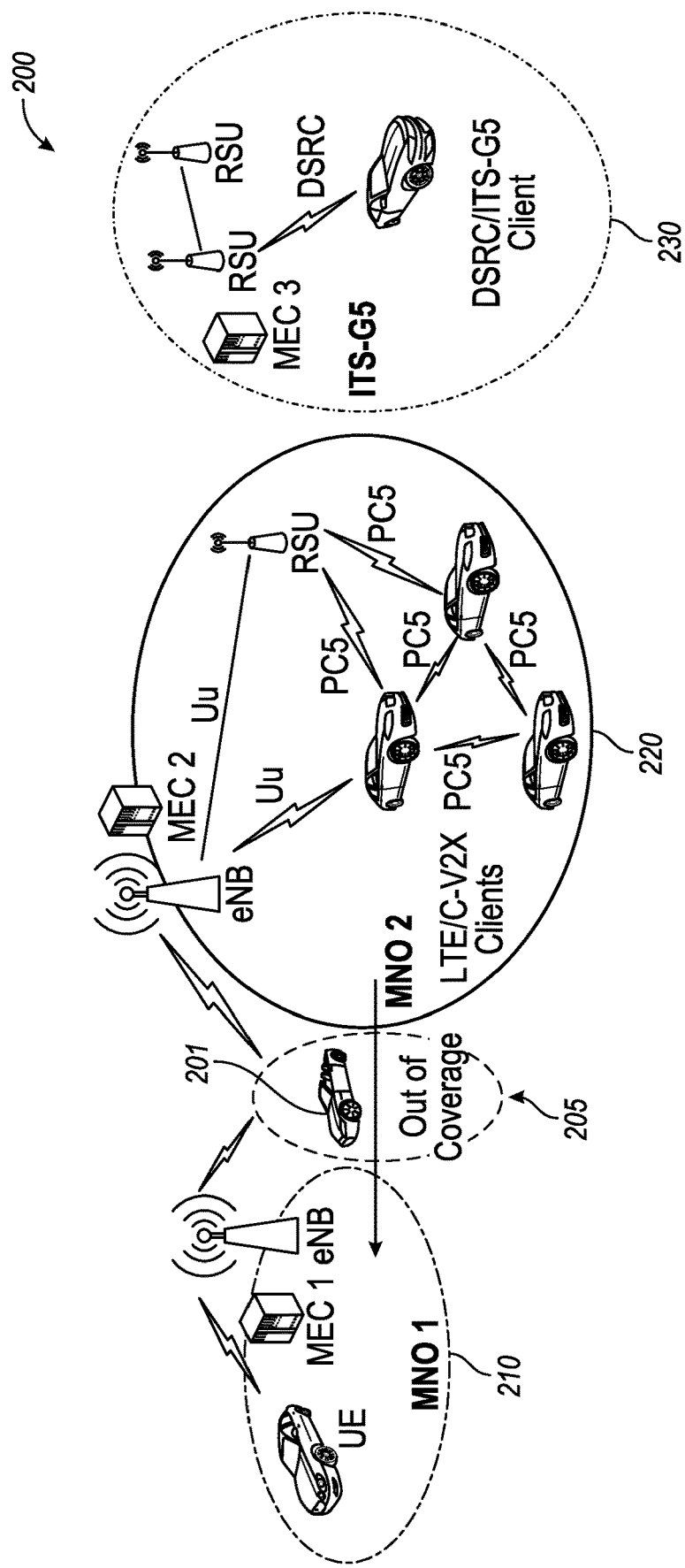
FIG. 2 illustrates a heterogeneous V2X scenario involving multi-MNO, multi-MEC, and multi-access communications, according to an example.

FIG. 2 illustrates an example heterogeneous V2X scenario 200 (multi-OEM, multi-MNO, multi-MEC, multi-access). Specifically, FIG. 2 illustrates a V2X scenario 200 with autonomous vehicles connected via networks 210, 220, 230 using different technologies, where each vehicle is in need of consuming computational services, or offering task offloading capabilities, or in need to coordinate with the other vehicles to perform some joint decisions. In particular, when vehicle 201 is in a non-coverage area 205 (e.g., out of coverage of networks 210, 220, 230), the vehicle 201 may experience service interruption.

Some conventional approaches have attempted to offer MEC infrastructure to vehicles, while falling short on many scenarios of mobility and temporary unavailability of MEC Services. Only recently ETSI MEC has opened a study item to assess the impact of unavailability of reliable high bandwidth backhauls connectivity and with the intention to study how terminal units, mobile hosts and personal devices can be used to support cloud computing at the edge. Nevertheless, detailed solutions have not been fully developed.

Moreover, while roadside infrastructures can facilitate autonomous driving, their deployment in the territory is not always covering entirely the set of cars present in the system. Furthermore, purely relying on partial vehicle-to-infrastructure connections to provide reliable services is insufficient. Among other reasons, this is because that the edge computing devices are sparsely deployed and typically constrained in communication coverage.

Some approaches have attempted to operate a VANET (Vehicular Ad hoc Networks), to provide a spontaneous creation of a wireless network among vehicles to exchange data. Connecting vehicles via a VANET represents an early attempt to support safety-related applications, such as accident warning, crash notification, and cooperative cruise control. However, a VANET often encounters issues with resource underutilization and heterogeneous large data. Thus, VANET utilization is mostly towards the safety applications and therefore can result in underutilization (or waste of) the allocated bandwidth and the capabilities offered by the overall V2V and V2X communication. This is a limitation in terms of efficiency, which are addressed with the solutions herein. Likewise, a VANET is not able to handle the varied type of a large amount of data being getting generated/consumed by fully-autonomous vehicles in the future in complement with data generated by the edge servers and cloud computing.

Some approaches have similarly attempted use of Edge computing processing for AVs. AVs work with data profusely starting from data acquisition, data processing to actuation. The three main tasks for AVs are Perception, HD mapping, and SLAM (Simultaneous localization and mapping). Processing this data at the Edge can save a significant amount of communication bandwidth and satisfy the key requirement of latency for mission-critical driving tasks. Edge computing provides critical localized infrastructure support for resource-intensive and cooperative apps. However, there are some scenarios where it is difficult to effectively use this edge computing infrastructure, for example, unavailability of edge or latency issues. For instance, in the case of natural disasters (e.g., if the cloud servers providing traffic condition data are destroyed due to natural disasters such as earthquakes or tsunamis), the driving decisions of AVs would also be affected. In these cases, MEC networks and services can be unavailable for a cluster of cars. Likewise, in other scenarios, the real-world wireless networks are unstable and unreliable, which can significantly affect the arrival timing of the infrastructure-side data. Complex and ever-changing traffic conditions can exacerbate this situation (e.g., in case of heavy loads on RSUs (Roadside units), or low capacity for content storage). In these scenarios, the MEC services that are available may only be reachable via an unreliable or under-performing network connection, and may not satisfy the QoS requirements coming from the Application (in need of consuming those services); thus, practically these scenarios, from a QoS perspective, is equivalent to MEC unavailability.

The following addresses a broader impact of unavailability of reliable high bandwidth backhaul connectivity, for these and other scenarios. The following also provides consideration to how terminal units, mobile hosts and personal devices can be used to support cloud computing at the edge.

Figure 3A:
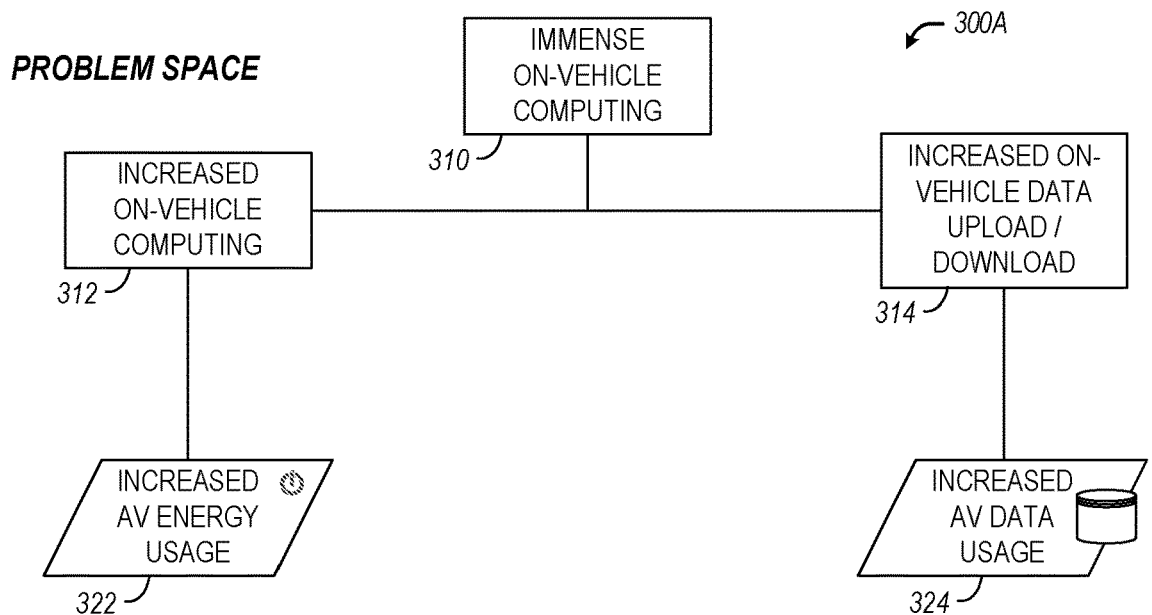
FIG. 3A depicts problems and constraints relevant to an AVDN.

FIG. 3A depicts problems and constraints relevant to an AVDN, according to an example. These include: the need and capabilities for immense on-vehicle computing 310; the increase in on-vehicle computing capabilities 312 and accompanying increased on-vehicle energy usage 322; and the increase in on-vehicle data transfers 314 (upload/download) and accompanying increased on-vehicle data usage 324.

Here, a purpose of an established AVDN is to enable the execution of the algorithms and logic in the AVDN aiming at cost reduction, sharing, and optimization. Nevertheless, since many car OEM or service providers may want to use their own algorithms, the following introduced API is not standardizing the specific algorithms, but can provide an abstracted communication layer enabling the introduction of implementation-specific algorithms from the various stakeholders.

The provision of proper MEC functionality to support the V2X communication within the AVDN will allow all the entities in the network to share their on-vehicle computing infrastructure. For instance, this may be achieved by: sharing the available memory/storage; sharing the available computation resources with other AVs; sharing the autonomous computing results; sharing sensor data and other on-vehicle data (and privacy/security policies associated); sharing the actual downloaded data, e.g. maps, traffic data, software updates, etc.; and broadcasting/multicasting/sharing their available bandwidth with other vehicles.

In particular, the goal of reducing cost can be achieved by sharing the autonomous vehicle computing infrastructure— e.g., vehicles located in the specified geographical zone. In turn, this means requesting/sharing the information/decision, e.g., the result of intensive computing tasks done by AV on-vehicle computation hardware, required for the proper functioning of an autonomous vehicle. Also, the goal of sharing cost can be achieved by sharing the bandwidth between the AVs for the most frequently used data like video data and the reusable/common data (from a MEC server or Map/navigation data provider) which may be required for each autonomous vehicle to successfully navigate the geographic space. Instead of each AV making individual download from the edge or a server, they reuse the data (specifically required for similar AV tasks) by sharing among each other in a pre-marked geographic region. Both approaches overcome long propagation delays, choked backbone networks, and unacceptable latency.

It will be understood that reducing cost and sharing cost are not in the alternative, but in principle, an optimization algorithm can follow one of them or both. Of course, based on the different goals, the optimization may lead to different actuations and results (in terms of costs for the individual vehicles).

Figure 3B:
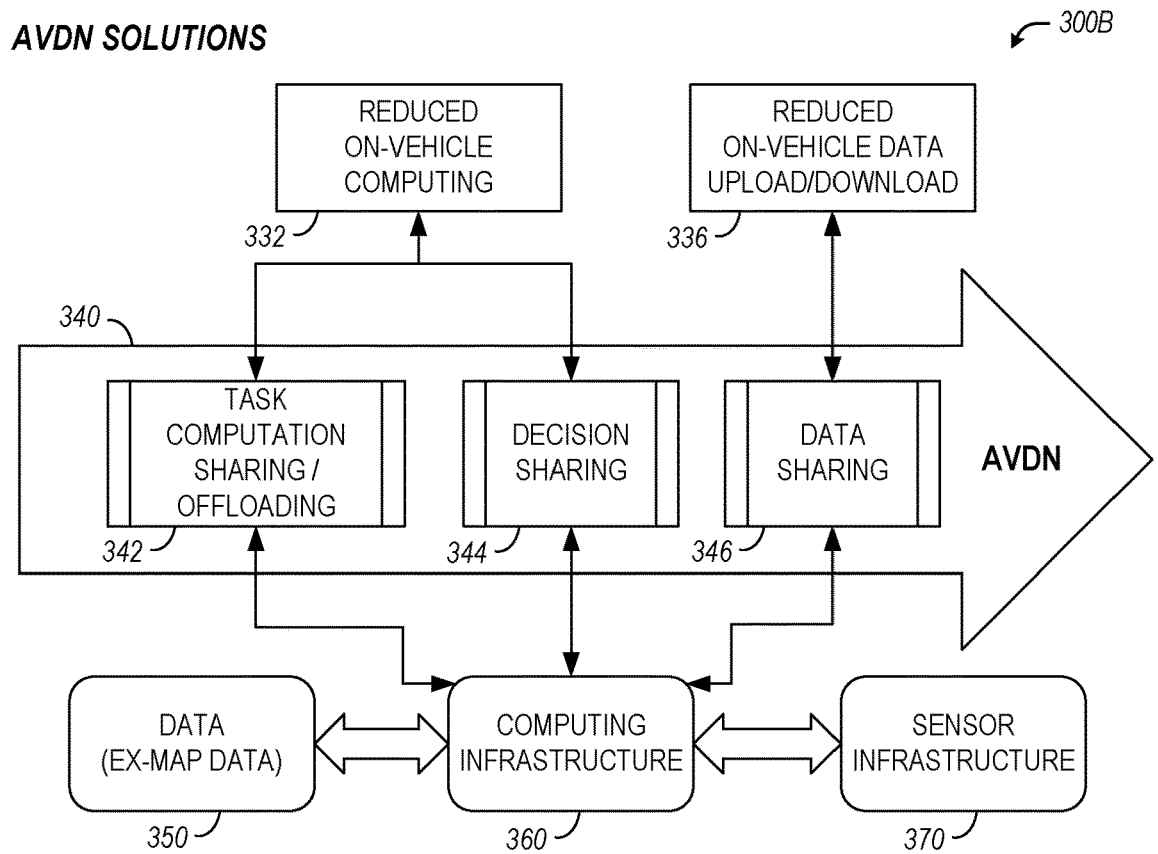
FIG. 3B depicts an AVDN infrastructure, overlaid on the problems and constraints, according to an example.

FIG. 3B depicts an AVDN infrastructure, overlaid on the problems and constraints relevant to an AVDN, according to an example. An AVDN 340 may be defined to include a set of devices (e.g. cars) communicating with each other for reducing/sharing cost by sharing bandwidth and by sharing on-car computing infrastructure. The services enabled by the AVDN may include: task computation sharing and offloading 342, decision sharing 344, and data sharing 346. Other services may be provided. The result of such services may enable a reduction in on-vehicle computing 322 and a reduction in on-vehicle data transfers 336 (uploads and downloads).

The use of the AVDN services enables improved usage of data 350, computing infrastructure 360, and sensor infrastructure 370, offered by the AV or other entities. Concerning bandwidth, during an average day, each self-driving car may produce as one example more than 4 terabytes of data. By sharing the bandwidth/communication resources (data 350) in this network, the ownership cost of the autonomous vehicle can be reduced by better monetizing data throughput. By sharing the on-car computing infrastructure 360, computing devices present on autonomous cars are made available as logic structures, and vehicles might use each other's processing capabilities to achieve a given (or common) goal for the respective pre-defined geographical region. Such sharing would free up HW/SW resources onboard autonomous cars, leaving more processing bandwidth for mission-critical, real-time response activities such as collision avoidance. Additionally, bandwidth sharing is allowing better and more efficient usage of the radio spectrum, which leads to cost-saving for telecommunication operators.

To accomplish an implementation of the above objectives, the following introduces a proper signaling framework. In this framework, meaningful information is transferred among the various entities of the AVDN, enabling insights and proper decisions made by optimization algorithms (e.g., running on the cars or in the network, or running on the MEC infrastructure) aiming at reducing and/or sharing the cost. This signaling can be standardized to allow an interoperable solution that will work in a multi-vendor solution with multiple devices.

For example in a smart city, an AVDN may be composed by a City Bus Fleet (e.g. owned by the public administration). In this scenario, the municipality may need to jointly optimize the whole fleet costs and could need to manage multiple bus vendors. Likewise, an AVDN may be composed of autonomous vehicles that are part of a Taxi fleet (ridesharing) owned by a set of individual professionals associated with a single taxi drivers' company. In this case, the multi-MNO environment is a likely scenario, as each taxi may be also connected to a different operator. Further, cost-sharing may not be a goal, rather instead cost minimization for each individual vehicle separately.

Aspects of this communication framework may be standardized, since in these heterogeneous scenarios the messages should be readable by anyone in the AVDN. In that perspective, the ETSI MEC architecture provides a suitable reference, and features of the AVDN may be targeted for standardization in the MEC V2X API in order to provide signaling which offers optimization of cost.

In this context, a variety of algorithms may be used to implement the specific optimization problem (e.g., applying many mathematical models and various tools from research literature). However, the proper signaling and set of messages, with related Data Types (e.g., to be standardized in ETSI MEC) can ensure proper interoperability for producing the information sharing in the set of devices participating in the AVDN. Furthermore, while the following may not define a specific optimization algorithm, a variety of inputs and outputs may be enabled in the communication framework that are related to this optimization problem.

A variety of hardware configurations and implementations may be used to establish the AVDN. As a first example, the AVDN can be realized with a dedicated hardware interface onboarded in each autonomous vehicle handling the information exchange and any communication related to the AVDN network feature.

As a second example, a dedicated/separate hardware (HW)/CPU may be used to enable high-speed communication between multiple AVs in an AVDN. A dedicated HW component will also help in solving the other aims of security and data exchange between the AVs in the proposed AVDN. The dedicated HW component can also provide flexibility and support the integration of the AVDN feature in vehicles. Among other examples, a dedicated offload engine with accelerators (e.g., powered by a microcontroller) may provide independent, low-DMIPs (Dhrystone MIPS) computing and high-speed I/Os for AVDN applications. Such dedicated HW may also host new functions like remote, out-of-band device management, network proxy, embedded controller, and encryption/Firewall, etc.

This AVDN and related sharing capabilities may provide a variety of major benefits for optimizing the network of vehicles. Among other reasons, many critical decisions can be performed locally within the distributed network. Such decisions and optimizations can assist the following:

Greater Data/Watt Economy due to improved monetization of data throughput. This may be accompanied by a reduced cost of data with the data service provider and mobile network providers, and therefore, a reduced cost of ownership, and improved environmental benefits from reduced congestion in the network and less energy (watt) consumption.

Local handling of fault management (for example, in case of an accident involving three vehicles, i.e. Vehicle H, Vehicle A, and vehicle B).

Fewer traffic collisions and increased safety.

With effective V2X communication, autonomous vehicles can share their sensing information and perception outputs. This enables various cooperative driving techniques. The introduction of a mechanism to share resources in an interoperable way via international standardization will increase interworking and avoid market fragmentation of edge computing solutions, and foster the creation of an ecosystem of applications using MEC infrastructure.

In an example V2X communication scenario, a hierarchical framework is composed of the following components: 1) establishment of a collaborative network of vehicles (the AVDN); 2) definition of Anchor-SP vehicles in the AVDN; 3) definition of a communication protocol in the AVDN; and 4) AVDN procedures for cost reduction/sharing/optimization.

1) Establishment of a Collaborative Network of Vehicles (AVDN)

Figure 4:
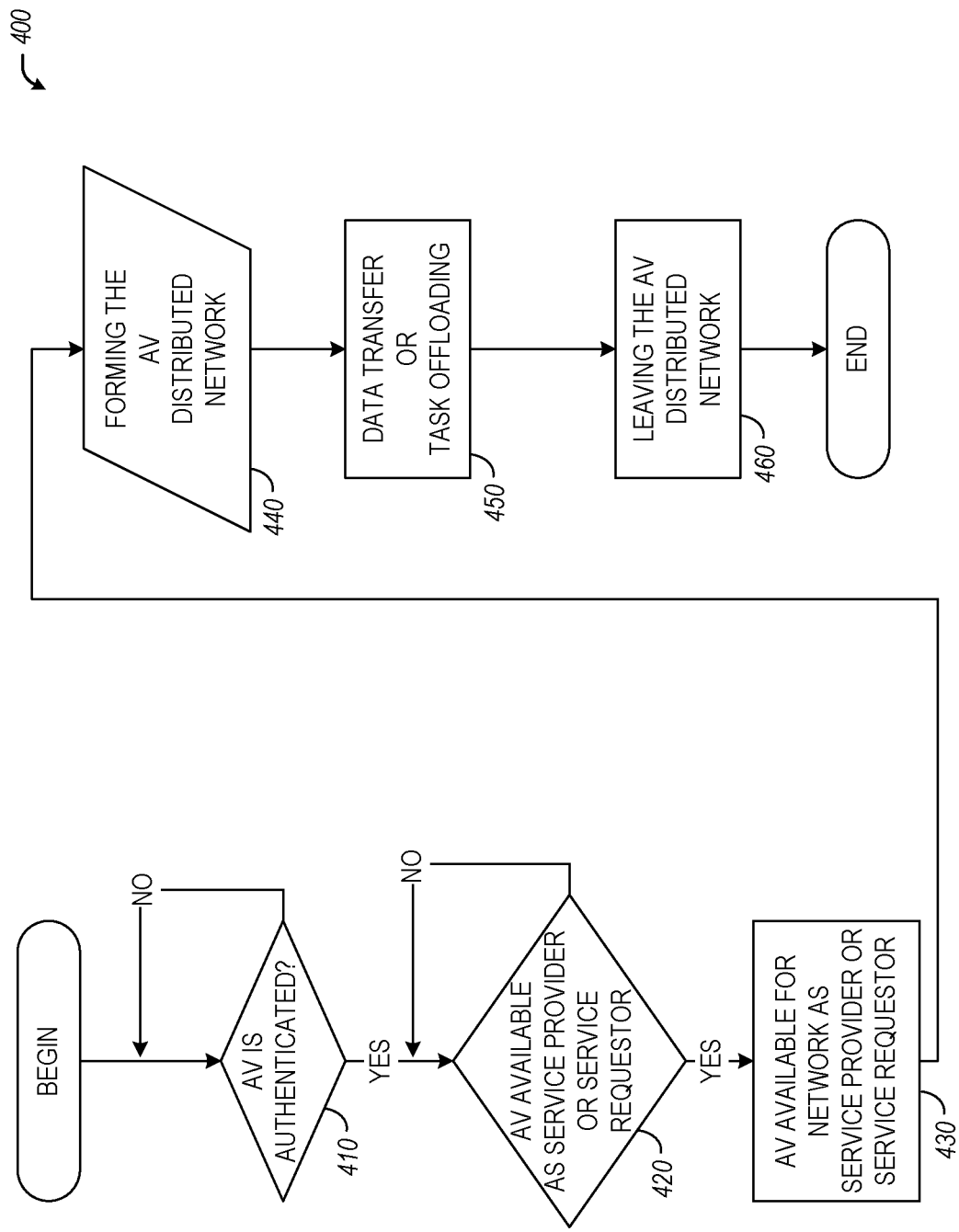
FIG. 4 depicts a flowchart of an AV joining an AVDN, according to an example.

The establishment of a collaborative network of vehicles (the AVDN) enables consumption and production of services, where vehicles can authenticate and take part in the network, as SP (service provider) or SR (service requestor). FIG. 4 depicts a flowchart 400 of an AV joining the proposed AVDN. It will be understood that additional operations may be provided or substituted.

The operations of FIG. 4 may be based on AV authentication (decision 410). In an example, before vehicles are made available for the proposed AVDN, the vehicles will be authenticated and will retain an authentication token which can be used later. In an example, this may be provided with a request for authorization/authentication. A Request API may be provided for an AV to be authorized or authenticated for future participation in the AVDN (e.g., as authorized or authenticated from some Data provider/OEM/Third party verification authority).

Further operations depicted in flowchart 400 include evaluation of whether the AV is available as a service provider or service requestor (decision 420), configuration of the AV into the network as a service provider or service requestor (operation 430), formation of the AVDN (operation 440), data transfer or data offloading operations (operation 450), and ultimately leaving or changing the AVDN (operation 460).

In an example, a request API may be defined as follows:

TABLE 1

| API name | Description |
| --- | --- |
| avdn/AV/ rqst_for_auth | API will be used by different AVs (from different AV providers/OEM) for authentication requests by some approved authentication server. |

Figure 5:
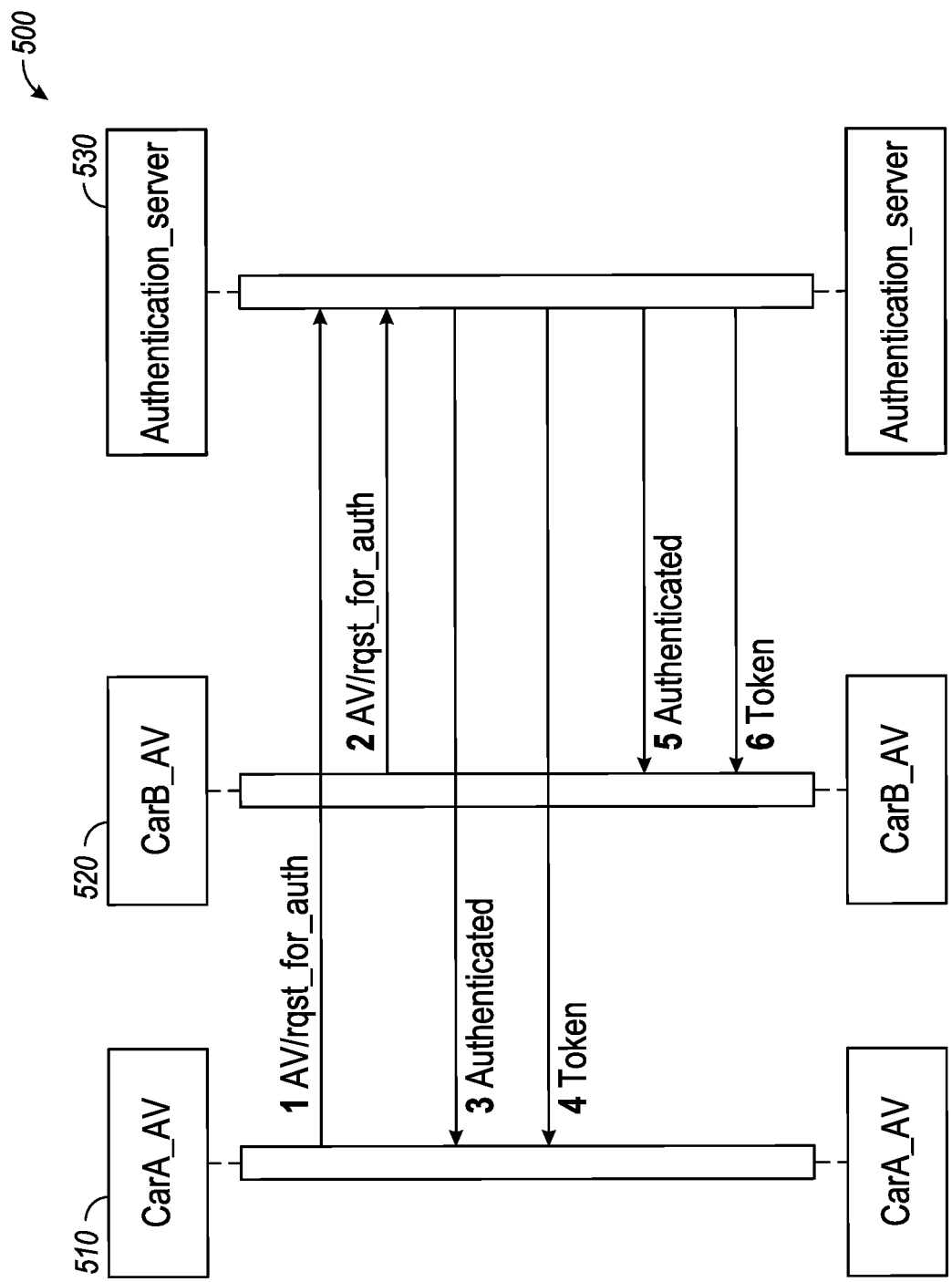
FIG. 5 depicts a sequence diagram of multiple AVs providing a request for authentication, according to an example.

FIG. 5 depicts a sequence diagram 500 of multiple AVs, CarA 510 and CarB 520, providing a request for authentication in a network from an Authentication Server 530, using a request for authentication API. Here, this scenario shows how each car 510, 520 invokes a request for authentication (operations 1, 2), followed by an indication of authentication (operations 3, 5) and receipt of a token (operations 4, 6) for the respective vehicles.

In an example, the network is populated by two categories of AVs—a Service Provider (SP) or Service Requestor (SR)—which are joining the AVDN for different reasons.

A SR may join due to: no network coverage (e.g., signal attenuation); latency-related consideration and Emergency situations; Functional Safety (FuSa) or safety-related scenarios/conditions (e.g., cases where vehicles may not be able to communicate correctly due to effects like shadowing, caused by obstacles such as buildings and also requirements for extremely low latency critical data); or other considerations such as when it is more resource-efficient to join the AVDN.

A SP may join due to: hardware resources available for pooling (e.g., Extra HW resources available for the computation task offloading with other UEs); Availability of reusable data (e.g., availability of AV Driving Decision data—captured camera/LIDAR/sensor Data; or availability of data that can be shared or reused multiple times, such as traffic data, next free parking space, infotainment data, etc.). Using a local AVDN can significantly reduce the delay for downloading large files in comparison to other content downloading solutions.

Figure 6:
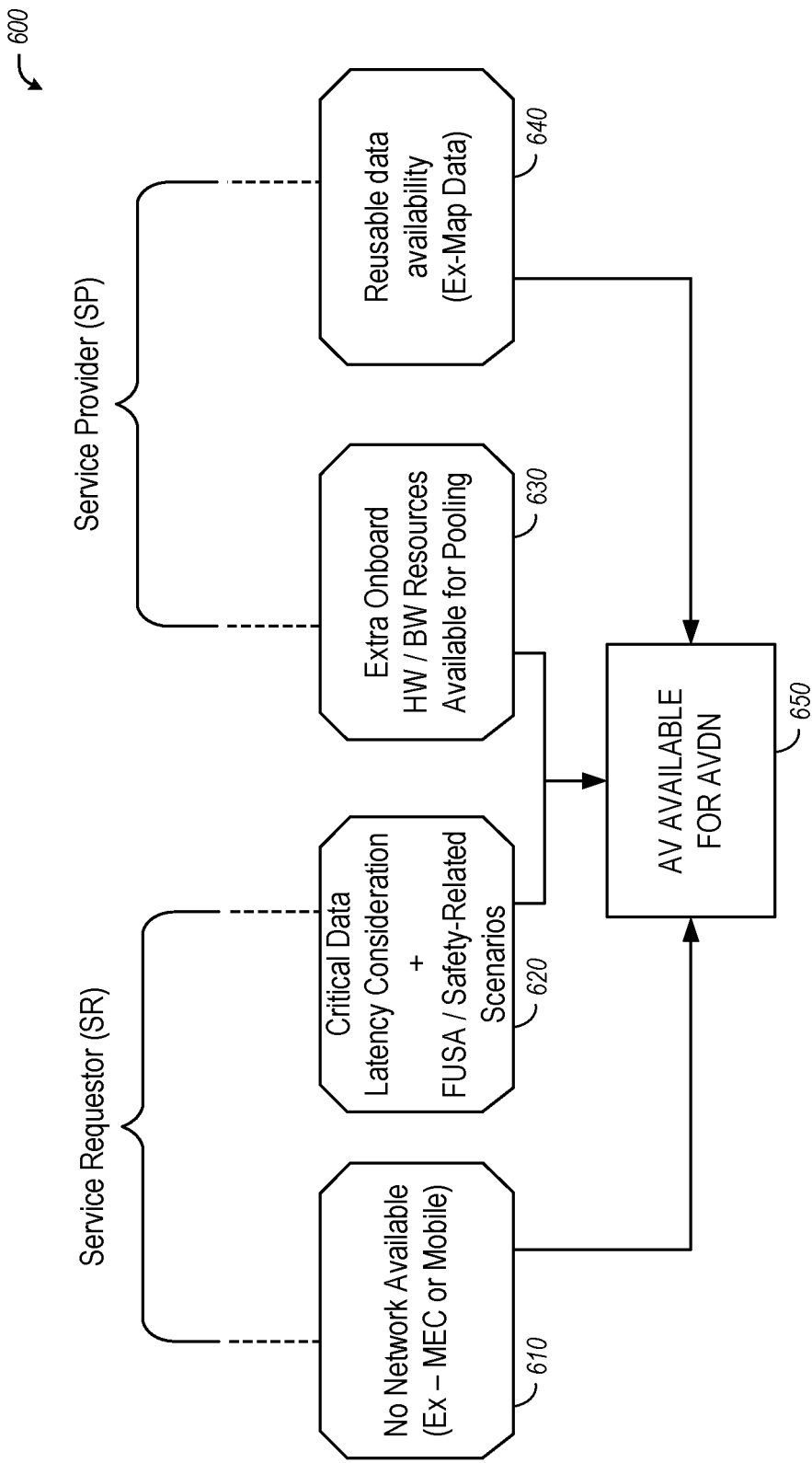
FIG. 6 depicts a flowchart relating to example considerations for service requester and service provider entities, for joining an AVDN, according to an example.

FIG. 6 depicts a flowchart 600 illustrating example considerations of service requester and service provider entities for joining an AVDN. Here, this flowchart 600 shows how a service requestor may have considerations such as: network availability 610 (e.g., no access to a MEC network or to a mobile network); operational scenarios (e.g., whether there is critical data to transmit, obtain, or process; an amount of latency that will occur; whether there are functional safety or safety-related considerations). This flowchart 600 also shows how a service provider may have considerations such as: resource availability 630 (e.g., whether there are extra on-board hardware or bandwidth resources available for pooling); and data availability (e.g., whether reusable data such as map data is available). Other considerations may be present. Based on such considerations, a determination may be made whether the AV is available for use or operation in the AVDN 650.

In an example, the following data types may be used in connection with resource considerations:

TABLE 2

| Data Variable | Description |
| --- | --- |
| avdn_D_rsr | Status variable informing about the availability of the idle resource (SP) for pooling i.e.<br>1. Computing HW resources.<br>2. Storage HW resources<br>3. Named Data (RT situation awareness, Map data, Sensory data, etc.) |
| avdn_D_auth | Token for Authentication for participation in AVDN provided by the authentication server to individual AVs, allowing them to participate & authenticate in AVDN. |

Further aspects may include APIs or data structures for forming the AVDN Cluster (e.g., after confirming the vehicle is available for AVDN either as a SR or SP). As a further detail, the various AVs in the AVDN may be equipped with at least a Client App, and additionally, host an in-vehicle MEC Platform (with simplified functionalities and a reduced set of MEC APIs with respect to the fixed MEC platforms hosted in the infrastructure). In these cases, the local Client App in the car is coupled with a local MEC App.

Figure 7:
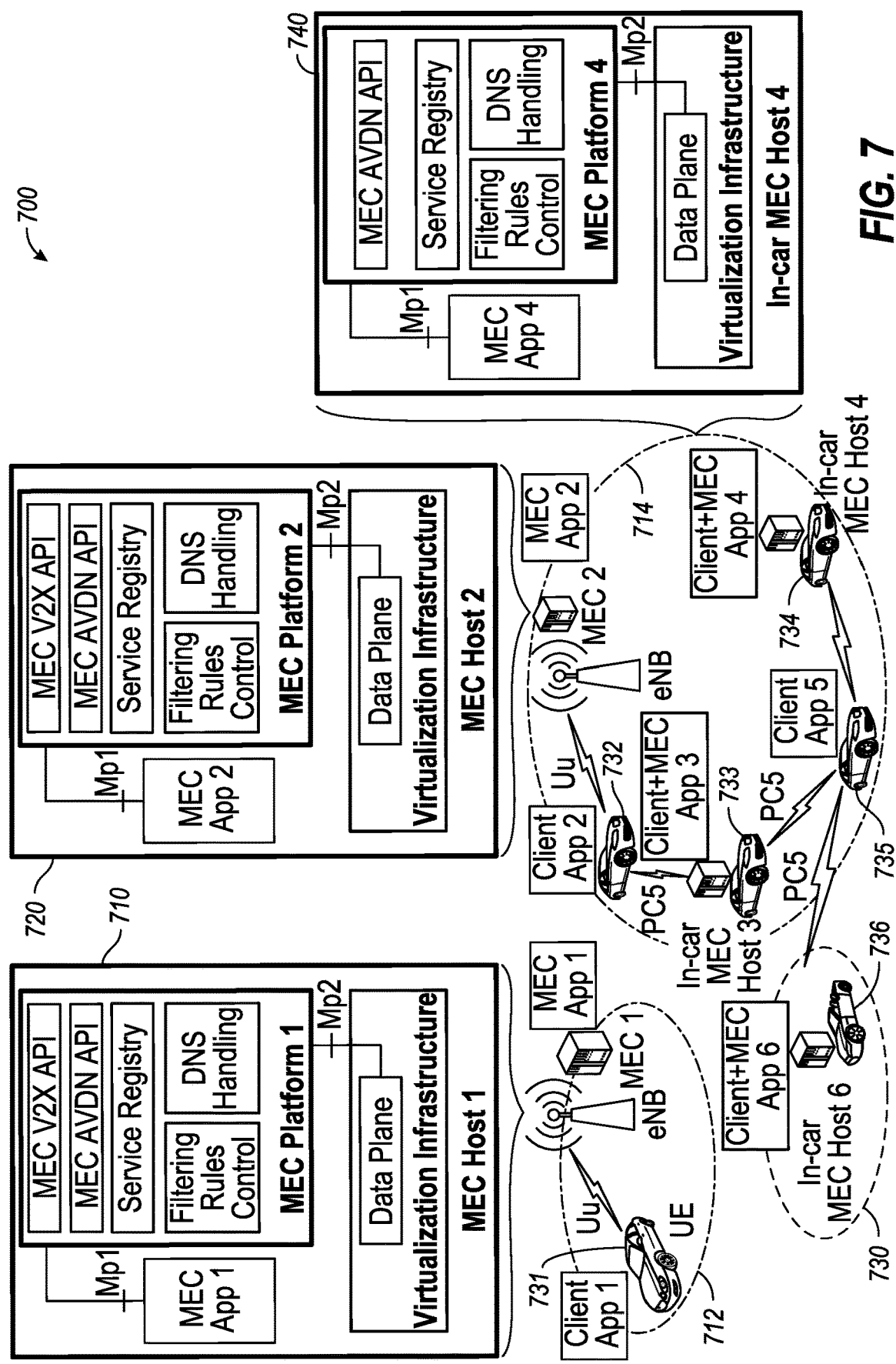
FIG. 7 depicts multiple possible combinations of use cases in an AVDN, with use of a MEC infrastructure, according to an example.

FIG. 7 depicts multiple possible combinations of use cases 700 in an AVDN, with use of a MEC infrastructure, according to these considerations and configurations. Note that the set of functionalities in a vehicle is independent of its role in the AVDN. In principle, a vehicle can have a very powerful MEC Platform with many functionalities and computation capabilities, but at the same time act as SR in the AVDN or vice versa.

As a summary of the use cases 700, a first network 712 operates to provide services to clients, such as from a MEC host 710 to a client app operating at a vehicle 731. Likewise, other networks may operate, such as a network 714 which directly or indirectly provides services to clients (e.g., vehicles 732, 733, 735, 734) from MEC host 720. Additionally, one or more of the vehicles (e.g., vehicle 733, 734) may operate an in-car MEC host (depicted with MEC host 740 for vehicle 734). Additionally, a vehicle 736 may be out of a network coverage area and operate another MEC host instance.

One of the most challenging cases for an SR occurs when a vehicle is not directly connected to the network (e.g., considering vehicles 733, 734 in FIG. 7), or not hosting any in-car MEC platform (vehicle 735 in FIG. 7), or outside of network coverage (vehicle 736 in FIG. 7). In these scenarios, a vehicle may want to consume some MEC resources (e.g. MEC host 2 in FIG. 7) and will need to join the AVDN as SR.

2) Definition of Anchor-SP Vehicles in the AVDN

Further processing may include a definition for special "anchor" vehicles in an AVDN. Such anchor vehicles may include MEC-enabled vehicles that can act as SPs and support vehicles who are not directly connected to a MEC system or only a subset of MEC Services, for any reason, e.g., because out-of-coverage or under different networks, or connected with different systems.

Figure 8:
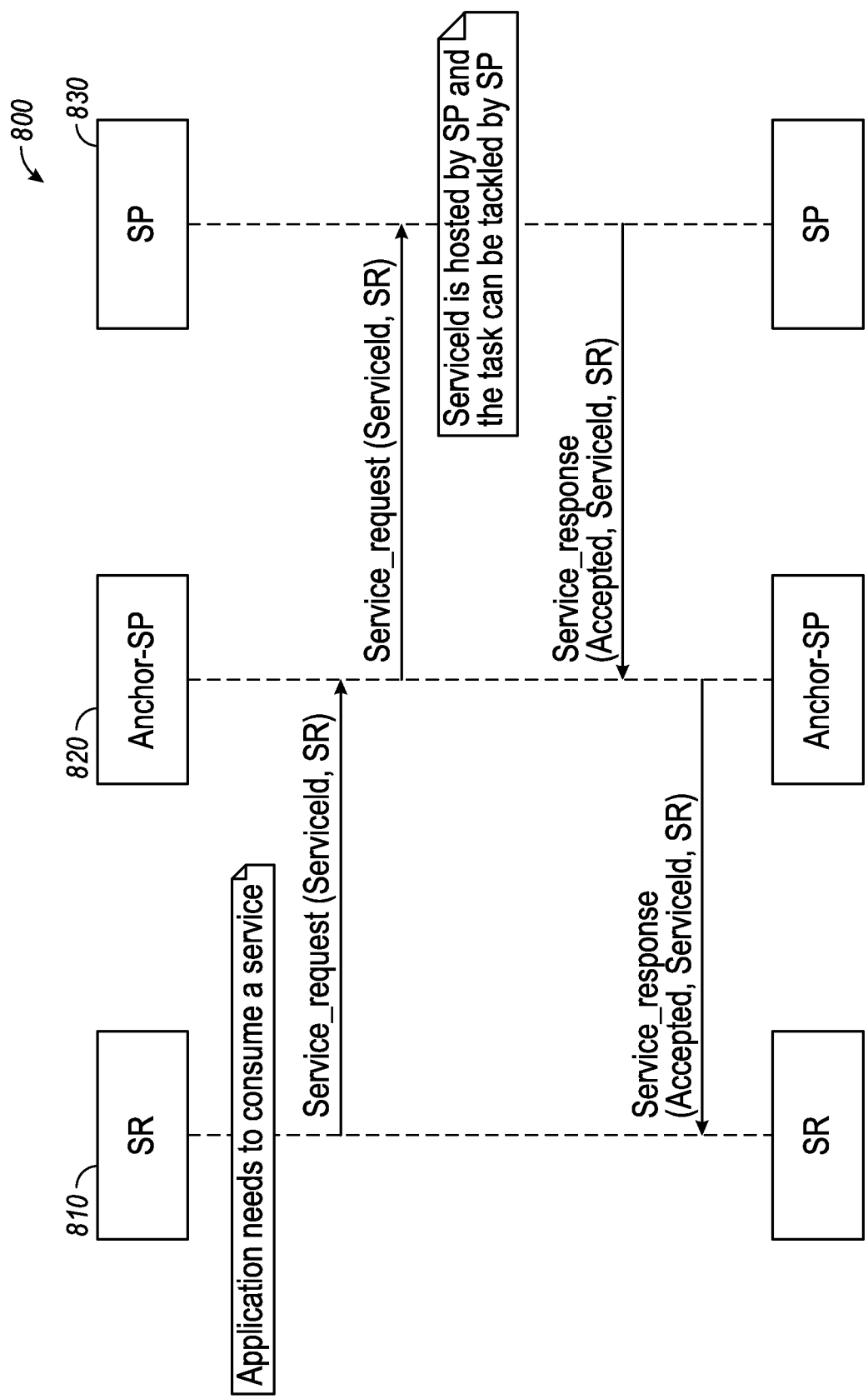
FIG. 8 depicts a message sequence chart of a service request originating from a service requestor of an AVDN, according to an example.

FIG. 8 depicts a message sequence chart 800 of a service request coming from an SR 810. Here, this service request includes using the relaying role of an Anchor-SP 820 to forward the request to the actual SP 830 hosting the requested service.

The duties of the Anchor-SP 820 are: Discovering the available services in other SPs; and relaying and dispatching requests from SR 810 to the appropriate SPs.

If the Anchor-SP 820 is capable to satisfy autonomously the request from the SP 830, a relaying is not actually needed, and in this case, the Anchor-SP 820 can act directly as SP 830. Additional aspects not discussed herein may include how the Anchor-SP 820 discovers SPs in the AVDN, and how SPs are selected by the Anchor-SP 820.

Further, in this scenario it is assumed that the SR 810 knows the existence of an Anchor-SP 820 since the joining of the AVDN. Because multiple Anchor-SPs can be present in the network, additional aspects not discussed herein may include how the SR 810 selects the appropriate Anchor-SP 820 to contact.

3) Definition of a Communication Protocol in the AVDN

The following defines a suitable communication protocol, after the establishment of the AVDN network. This protocol can allow all the vehicles to exchange information on their resources and computation capabilities, and offer or consume services as appropriate while communicating via PC5 or Uu links (in addition to other access technologies).

A first aspect may include how to be discovered by the AVDN. In an example, an Application in the AV will continuously check:

1) Availability: For AV availability as either SR (Service Requestor) or SP (Service Provider) i.e. API avdn/AV/CHK_rsr. Based on the result of avdn/AV/CHK_rsr, AV will be decided as an SP (i.e. Service provider), or as an SR (i.e. Service requester);

2) Location: Where am I? The Geo Location of the AV plays an important part in the proposed AVDN. This may be provided using Geographical/GPS data 3) Proximity What is around me? Looking/searching for all other devices (AVs) in the pre-specified geo communicating via PC5 or Uu links.

Thus, the relevant aspects may include checking the geographic location, speed, and direction information. Based on this respective information, nodes will produce retransmission strategies for periodic beaconing.

An example API design (e.g., providing a list of all API supporting queries, tasks, subscriptions, notifications) may include the following:

TABLE 3

| API name | Description |
| --- | --- |
| avdn/AV/CHK_rsr | AVs will check themselves continuously for the availability of resources using the variable avdn_D_rsr |

A second aspect may include how to join the AVDN. When a vehicle runs an application, it becomes a cloud leader and recruits members (e.g., vehicles and RSUs in the vicinity) that can provide their resources to construct a vehicle cloud for the application. The types and search range of necessary resources depend on applications. For instance, the search range can be a predefined distance, a road section, or an intersection. Having determined the set of necessary resource types, the SR broadcasts a resource request message, RREQ, to nodes within the search range. Nodes willing to share their resources send a resource reply message, RREP, back to the leader with information on their resource capabilities.

Figure 9:
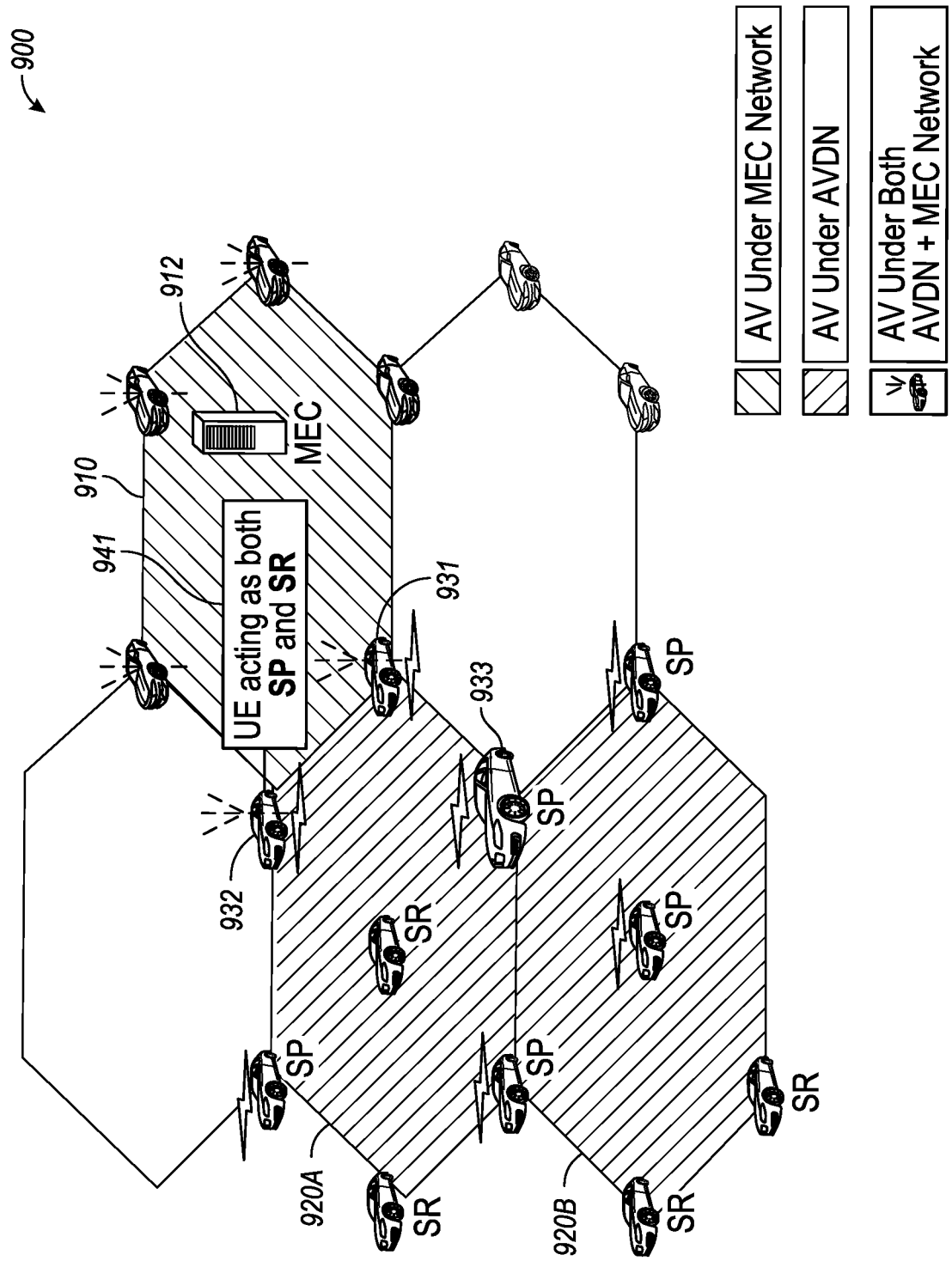
FIG. 9 depicts an example communication framework using an AVDN, according to an example.

FIG. 9 depicts an example communication framework 900 using an AVDN. Here, different network configurations are depicted, including a first geographic area under a MEC network 910 (e.g., operating with MEC host 912); a second geographic area under an AVDN 920A; and a third geographic area under an AVDN 920A. In addition to vehicles operating as SRs and SPs, there may also be UEs (e.g., UE 941) acting as both SR and SP. In an example, each car (e.g., vehicles 931, 932, 933) will have a table of all the vehicles that are in the geographic network area. A particular car will request to join the network with hello and GPS position.

This component may include use of the following data types:

TABLE 4

| Data type | Description |
| --- | --- |
| avdn_D_connect | Data variable identifying the status of the AV if it is still connected to the AVDN |
| avdn_D_auth | Data structure having the authentication certificate + GPS number |

This component may include use of the following APIs:

TABLE 5

| API name | Description |
| --- | --- |
| avdn/SR/Query_unicast | Unicast API from SP to SR. |
| avdn/SR/Query_broadcast | Broadcast request API from SR to all the SP(AVs) in the specified region. |
| avdn/SR/subscribe_grp | API for SR subscribe to the AVDN domain |
| avdn/SP/unsubscribe_grp | API for SP unsubscribe to the AVDN domain |
| avdn/SR/unsubscribe_grp | API for SR unsubscribe to the AVDN domain |
| avdn/av/connect_status | API for the AV to continuously check if they are connected to the AVDN(to SP) or not. |

Figure 10:
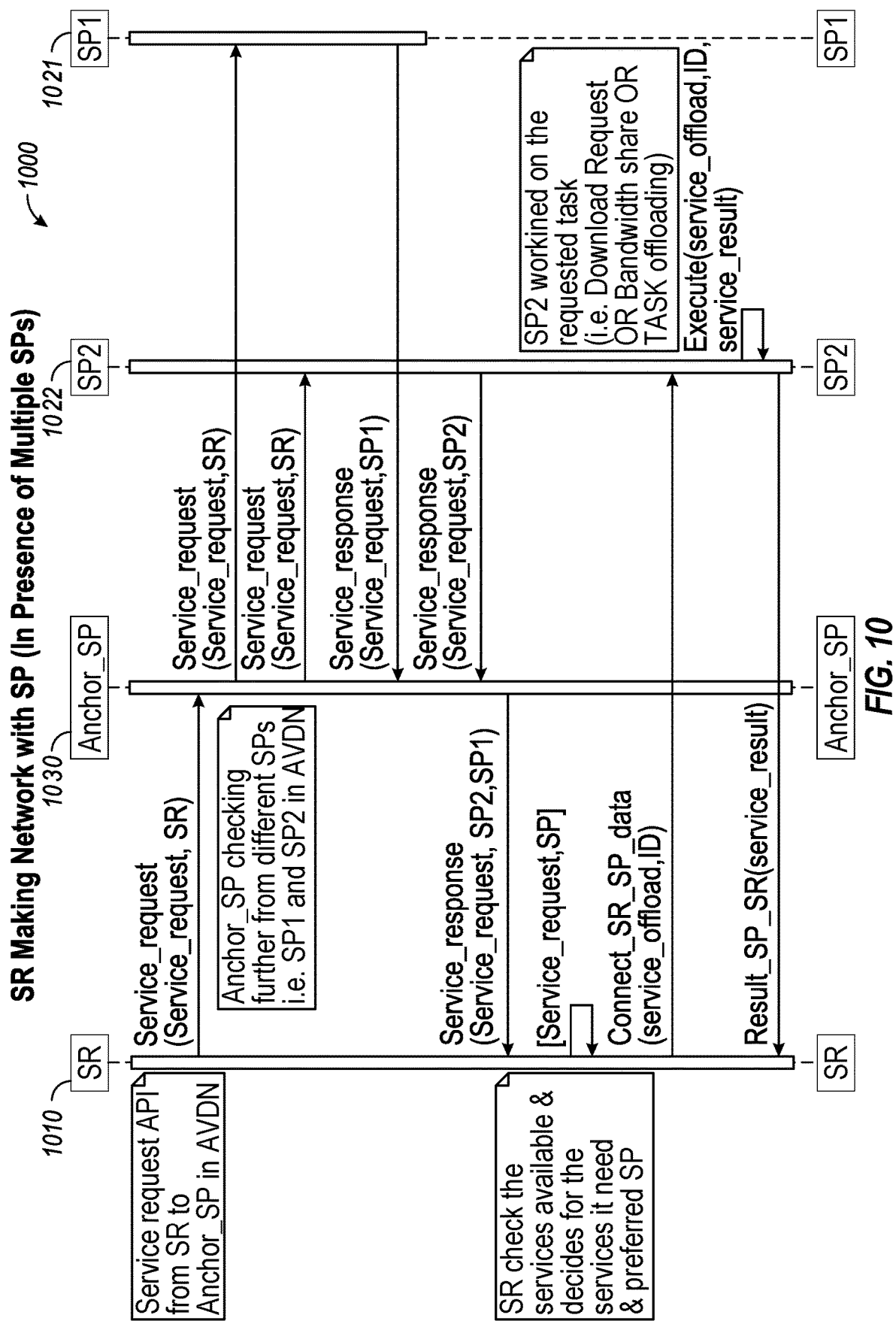
FIG. 10 depicts a further message sequence diagram for AVDN processing, according to an example.

FIG. 10 depicts a further message sequence diagram 1000 for AVDN processing. This diagram shows the choice of a SP (among SP1 1021 and SP2 1022), done by the SR 1010 and facilitated by the Anchor-SP 1030. In this scenario, the Anchor-SP 1030 forwards the incoming SR request to SP1 1021 and SP2 1022 and send back to the SR 1010 the list of SPs available. Finally, the SR 1010 selects the appropriate SR, and autonomously starts a dialogue with the selected SR. (In the example of FIG. 10, task offloading operations are provided).

4) AVDN Procedures for Cost Reduction/Sharing/Optimization

This component introduces an API abstraction layer enabling the execution of optimization algorithms Such algorithms that can lead to actions within the AVDN aiming at cost reduction/sharing/optimization and can be achieved both at vehicle level and AVDN (based on the chosen policy).

Each vehicle has three categories of resources—data storage, sensors, and computing—which will produce data that can be shared over this AVDN. Some of the ways that resources can be shared include:

1) Task offloading from one vehicle to another vehicle. Here a resource-constrained SR (autonomous vehicle) can request assigning tasks (for fully or partible offloading a computation-intensive task) to an SP with the main objective of energy saving. Apart from energy saving, the other significant reward includes, for example, proximity to the data generator device (e.g., sensors), which consequently helps both in terms of latency and increases the probability of correctness of localized data. Several types of task offloading can be performed in this AVDN.

2) Sharing of Data/bandwidth. Various kinds of localized data that can be exchanged between the vehicles using this AVDN network may include:

2a) Co-operative Perception. This use case is useful for situations such as hidden obstacle avoidance, safe lane-changing/overtaking, smooth braking/acceleration, etc.

2b) HD mapping data—Crowdsourced mapping. With this use case, vehicles can quickly update maps in case of sudden changes or to anticipate dynamic conditions and can be robust to error/failure of any one of the vehicles in the mentioned distributed network. changes or to anticipate dynamic conditions, and can be robust to error/failure of any one of the vehicles.

2c) Multi-vehicle SLAM. This may include, depending on available bandwidth, different content can be exchanged, e.g., local maps, graph-based representations, or topological maps. Out-of-sequence measurements, e.g., due to latency, should also be carefully handled.

2d) Software updates. This may include, the SR requesting the SP (with more available bandwidth or better service/data provider) to download Software updates required for the proper functioning of modern autonomous cars.

This component may include use of the following data types:

TABLE 6

| Data type | Description |
| --- | --- |
| avdn_D_Tsk_data | Data structure for SP to SR communication having the request/result of AV specific Computational tasks |
| avdn_D_Map_data | Data structure for bulk data from SP to SR having the reusable AV data. For Ex-Map_data or requested SW update data. |
| avdn_D_Data_url | Data structure having the source URL from where data needs to be downloaded. |

This component may include use of the following APIs:

TABLE 7

| API name | Description |
| --- | --- |
| avdn/SR/Rqst_tsk_offload | Task offload Request API from SR to SP. |
| Avdn/SR/Rqst_av_data | AV relevant data (for Example Maps) download request API from SR to SP. |
| Avdn/SR/Rqst_bw_shr | Bandwidth share request API from SR to SP. |
| Avdn/SP/query/data/pub_lcl_relvnc | API published by SP after joining the AVDN, publishing the local AV(SP) capabilities i.e. publish the data(having local validity and local relevance) available in local storage, which other Avs(SR) in the network can use. |
| Avdn/SR/query/data_lookup | Request API from the SR checking for specific (used for AV operations) data already stored in another AV(SP) |

Figure 11A:
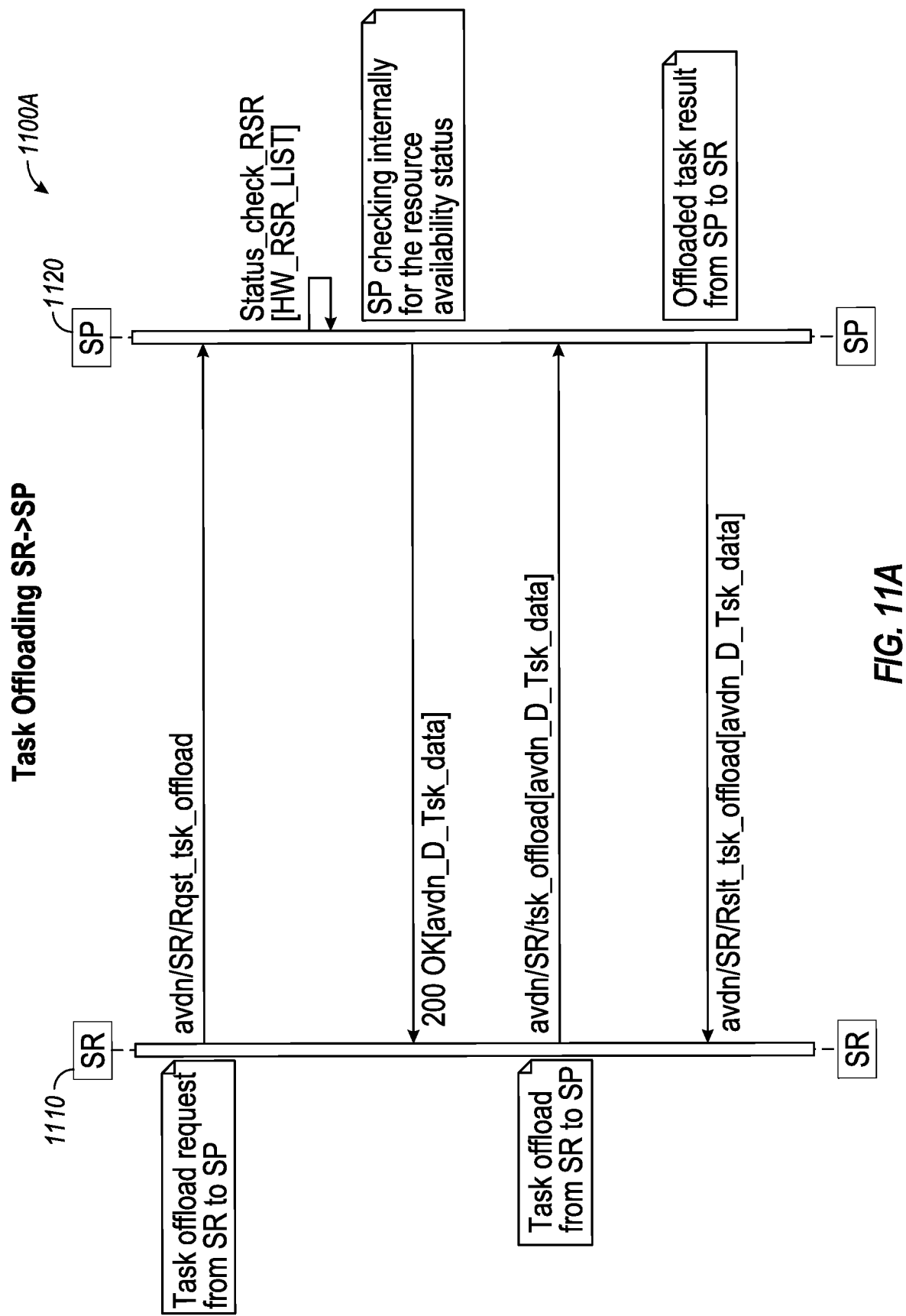
FIG. 11A provides a message sequence diagram showing the communication between AVs for task offloading, from a service requestor to a service provider, according to an example.
Figure 11B:
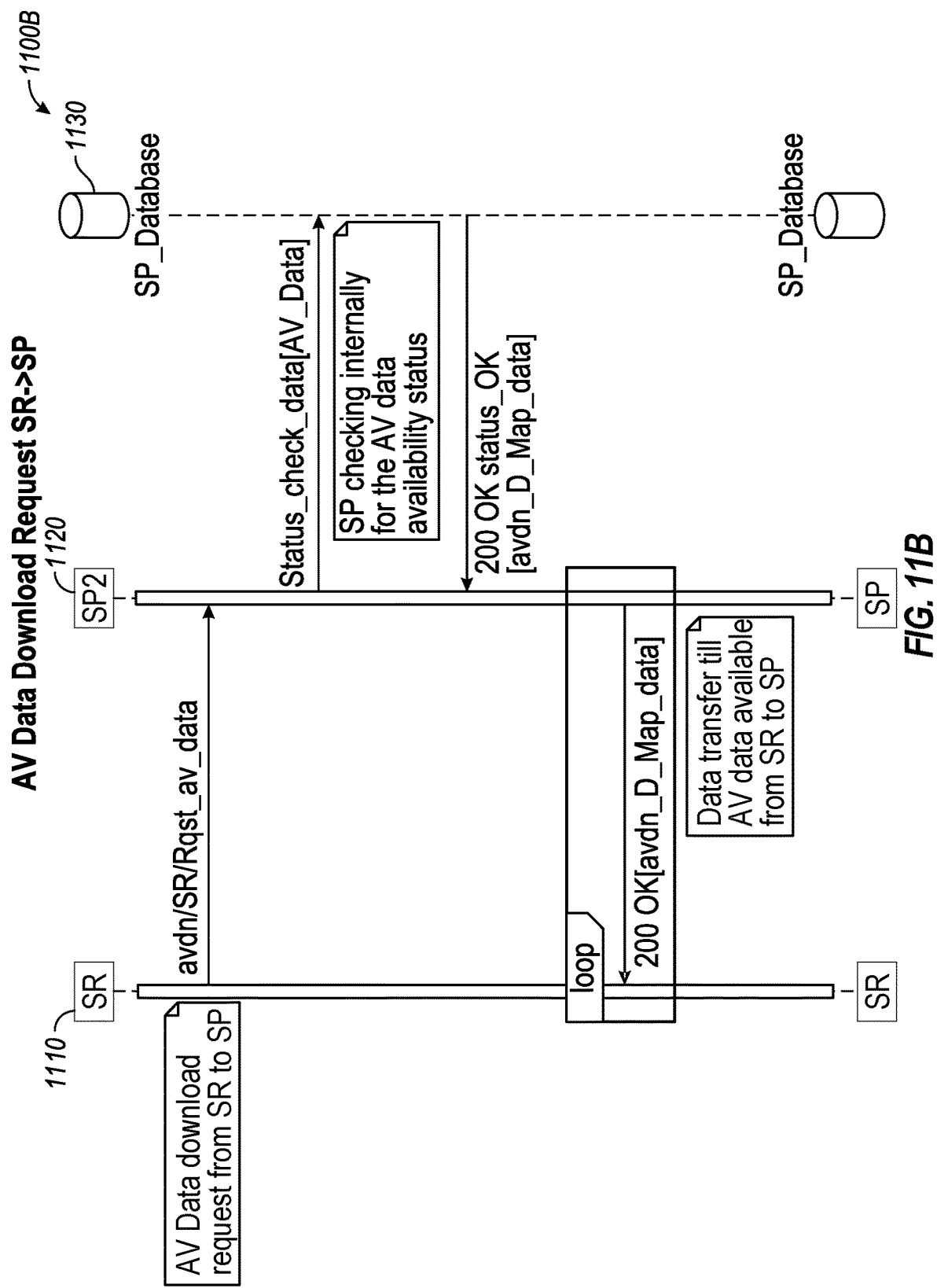
FIG. 11B provides a related message sequence diagram showing the communication between AVs for a data download request, from a service requestor to a service provider, according to an example.
Figure 11C:
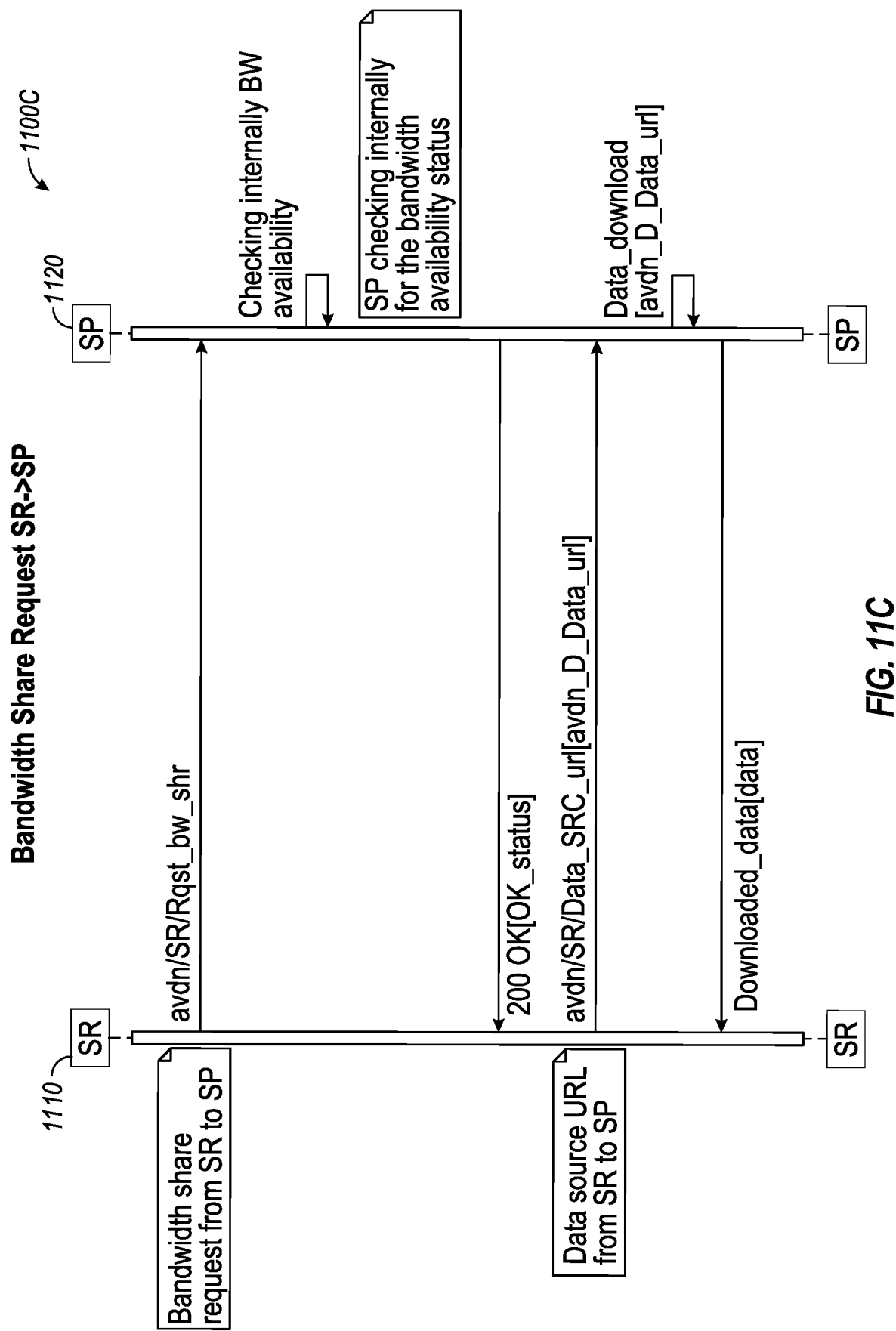
FIG. 11C provides a message sequence diagram showing the communication between AVs for a bandwidth sharing request, according to an example.

FIG. 11A provides a message sequence diagram 1100A showing the communication between AVs for task offloading, from a SR 1110 to a SP 1120. FIG. 11B provides a related message sequence diagram 1100B showing the communication between AVs for a data download request (from a SR 1110 to a SP 1120, to access a database 1130). Finally, FIG. 11C provides a message sequence diagram 1100C showing the communication between AVs (operating as a SR 1110 and SP 1120) for a bandwidth sharing request.

Although an SR and an SP are identified as endpoints for the communication, such endpoints may also be interpreted respectively as "service consumer" and "AVDN service" (e.g., with use of a MEC AVDN API hosted by the AVs). It will be understood that the "service consumer" can be any type of consumer of this API, e.g. a MEC App in the SR, or another authorized application. Furthermore, an "AVDN service," may be provided by implementation of this API, that can be hosted in any of the elements of the AVDN.

Figure 12:
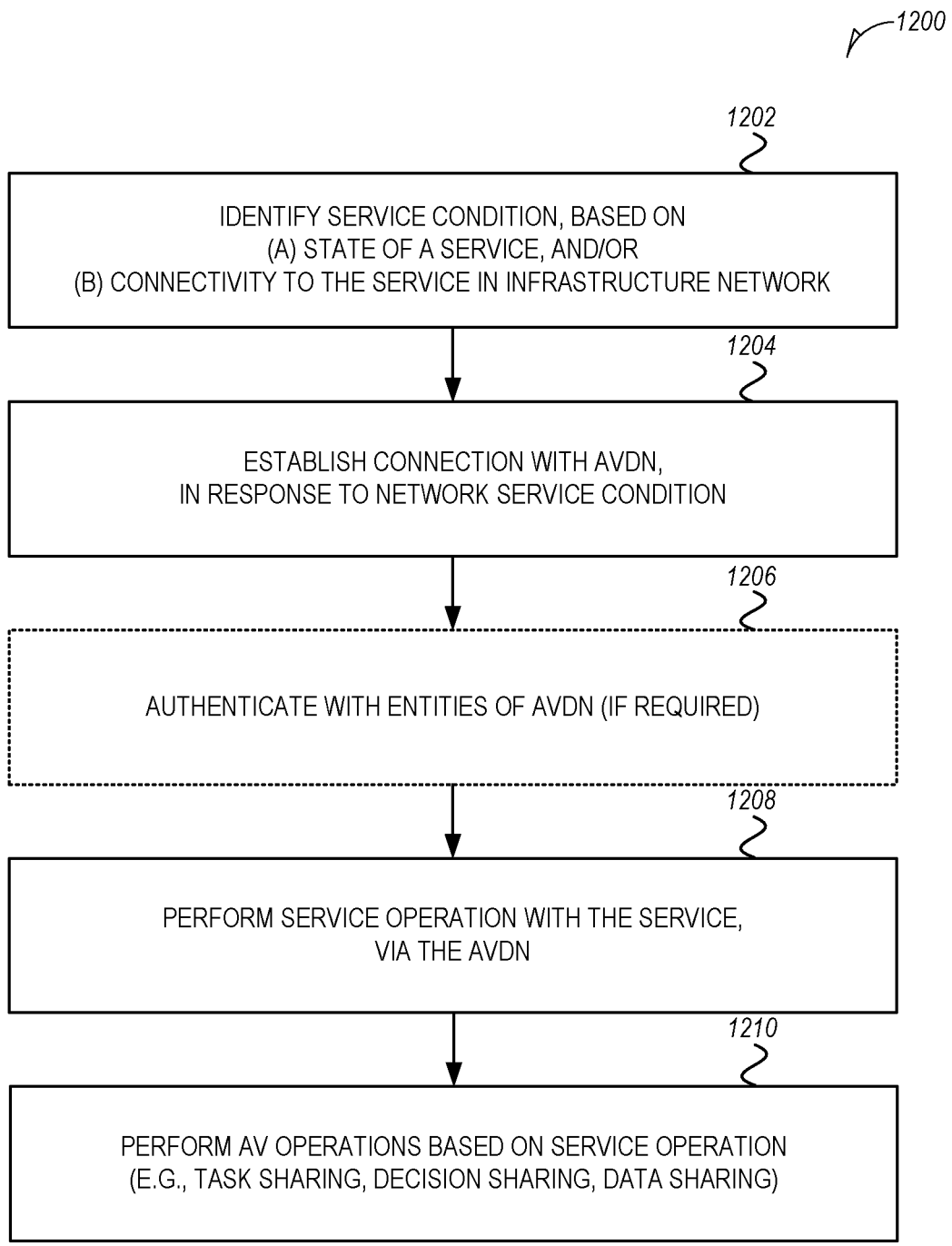
FIG. 12 provides a flowchart of an example process for configuring and operating AVs for use in an AVDN, according to an example.

FIG. 12 provides a flowchart 1200 of an example process for configuring and operating an AV for use with an AVDN. Here, the operations of this flowchart may be performed by a particular wireless networked computing device (e.g., an UE) of the AV (hereinafter, the "first AV"), or other communication and processing systems of the AV. It will be understood that other types of devices, nodes, appliances, and systems, and corresponding processes and operations, may also be implemented.

At operation 1202, the flowchart 1200 begins with operations to identify a service condition, based on (a) a state of a service, and/or (b) connectivity to an instance of the service in infrastructure network. For instance, the service condition may be identified in response to the UE being located outside a coverage area of the infrastructure network, such as in a setting where the infrastructure network comprises a 3GPP 5G, Intelligent Transport Systems (ITS)-G5, or Dedicated Short Range Communications (DSRC) wireless network operated from fixed locations (e.g., base stations, eNBs, RSUs). Consistent with the examples above, this service (or instances of the service) may be provided by a Multi-Access Edge Computing (MEC) host, such as in settings where the MEC host operates according to a standard from an European Telecommunications Standards Institute (ETSI) MEC standards family.

In specific examples, the service condition is identified in response to a change of the state of the service, associated with (e.g., caused by) one or more of: availability of data from the service; availability of a resource used by the service; unavailability of the instance of the service in the infrastructure network; or a safety-related scenario involving the first AV, a second AV, other AVs of the AVDN, or the service. Likewise, in specific examples, the service condition is identified in response to the UE being located outside a coverage area of the infrastructure network.

At operation 1204, the flowchart 1200 continues with operations to establish a connection in the AVDN to a second UE at a second AV in response to the service condition. This connection may be established using V2V or V2X network communications, as the AVDN is configured to provide connectivity between the UE and the second UE for use of the service. Here, the AVDN may be formed among a plurality of AVs including the first AV and the second AV (and, accompanying communication equipment/UEs/devices at such AVs).

At operation 1206, the flowchart 1200 continues with operations to authenticate with entities of the AVDN (as required). This may occur consistent with the examples provided in FIG. 5, discussed above. For instance, the authentication of the UE may include authenticating with an authentication server of the AVDN, where the connection with the AVDN is established in response to successful authentication.

At operation 1208, the flowchart 1200 continues with operations to perform a service operation with the service via the AVDN, using the connection to the second UE. In an example, the service operation relates to: data sharing, decision sharing, or task computation sharing, as discussed above. Further, the service operation may provide service fulfillment (of such data or operations) to an application operating at the first AV or the second AV.

In specific examples, the service operation performed by the UE includes operations to provide a service request to the AVDN, where the first AV operates as a service requestor, where the second AV operates as a service provider. In other specific examples, the service operation performed by the UE includes operations to fulfill a service request from the AVDN, where the first AV operates as a service provider, where the second AV operates as a service requestor. Likewise, in other specific examples, the UE may be configured to operate as an anchor service provider, and to perform a service request with a third UE of a third AV (and, obtain service response data, in response to the service request with the third UE, and ultimately provide the service response data to the second UE), as discussed in with reference to FIG. 10, above.

In various MEC network examples, the UE (at the first AV) may operate as a MEC client and the second UE operates as the MEC host; or the UE operates as the MEC host wherein the second UE operates as a MEC client. In still further examples, the service operation may be invoked, established, controlled, or otherwise performed using an Application Programming Interface (API) for the AVDN. Such an API for the AVDN can provide a standardized interface for the service operation between the UE and the second UE.

At operation 1210, the flowchart 1200 concludes with the performance of AV operations based on the service operations. These may include operations based on task sharing, decision sharing, data sharing, and the like. Other types of operations will also be apparent.

Other operations that correspond to other entities in an AVDN (UEs, AVs, communication systems, etc.) may also correspond to those described for flowchart 1200. For example, an AVDN system may include at least one network communication device adapted to perform vehicle-to-vehicle (V2V) or Vehicle-to-Everything (V2X) network communications, and at least one processing device that, when in operation, is configured by software (machine-readable) instructions to perform the operations of flowchart 1200 or a complimentary perspective. For instance, a complimentary perspective (at a service provider, or at a service requestor) may include operations to: (i) operate the network communication device to establish or connect with an autonomous vehicle distributed network (AVDN), using the V2V or V2X network communications; (ii) receive a service request via the AVDN, as the AVDN provides connectivity between the at least one processing device and at least one other device to operate at least one service; (iii) identify a service condition based on the service request; and (iv) perform a service operation with the at least one service, via the AVDN, based on the identified service condition.

Implementation in Edge Computing Scenarios

It will be understood that the present techniques associated with an AVDN may be integrated with many aspects of edge computing strategies and deployments. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by moving workloads onto compute equipment at satellite vehicles; using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

Figure 13:
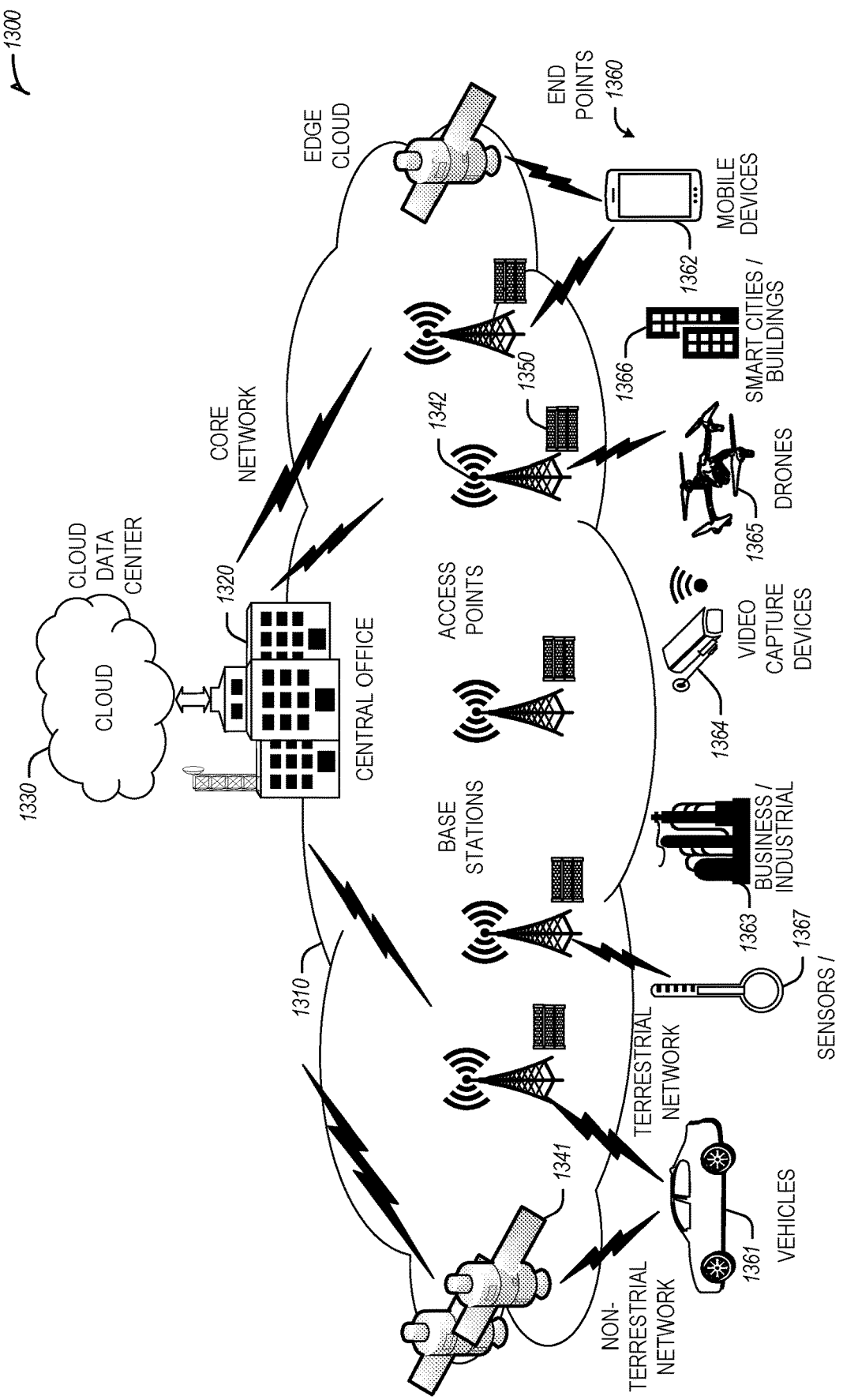
FIG. 13 illustrates an overview of an edge cloud configuration for edge computing, according to an example.

FIG. 13 is a block diagram 1300 showing an overview of a configuration for edge computing, which includes a layer of processing referenced in many of the current examples as an "edge cloud". This network topology, which may include several conventional networking layers (including those not shown herein), may be extended through the use of the satellite and non-terrestrial network communication arrangements discussed herein.

As shown, the edge cloud 1310 is co-located at an edge location, such as a satellite vehicle 1341, a base station 1342, a local processing hub 1350, or a central office 1320, and thus may include multiple entities, devices, and equipment instances. The edge cloud 1310 is located much closer to the endpoint (consumer and producer) data sources 1360 (e.g., autonomous vehicles 1361, user equipment 1362, business and industrial equipment 1363, video capture devices 1364, drones 1365, smart cities, and building devices 1366, sensors and IoT devices 1367, etc.) than the cloud data center 1330. Compute, memory, and storage resources which are offered at the edges in the edge cloud 1310 are critical to providing ultra-low or improved latency response times for services and functions used by the endpoint data sources 1360 as well as reduce network backhaul traffic from the edge cloud 1310 toward cloud data center 1330 thus improving energy consumption and overall network usages among other benefits.

Compute, memory, and storage are scarce resources, and generally decrease depending on the edge location (e.g., fewer processing resources being available at consumer end point devices than at a base station or a central office). However, the closer that the edge location is to the endpoint (e.g., UEs), the more that space and power are constrained. Thus, edge computing, as a general design principle, attempts to minimize the number of resources needed for network services, through the distribution of more resources that are located closer both geographically and in-network access time. In the scenario of the non-terrestrial network, distance and latency may be far from the satellite, but data processing may be better accomplished at edge computing hardware in the satellite vehicle rather than requiring additional data connections and network backhaul to and from the cloud.

In an example, an edge cloud architecture extends beyond typical deployment limitations to address restrictions that some network operators or service providers may have in their infrastructures. These include a variety of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to the end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services in which the compute resource will be "moved" to the data, as well as scenarios in which the data will be "moved" to the compute resource. Or as an example, a base station (or satellite vehicle) compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 13, traditional endpoint (e.g., UE, vehicle-to-vehicle (V2V), vehicle-to-everything (V2X), etc.) applications are reliant on local devices or remote cloud data storage and processing to exchange and coordinate information. A cloud data arrangement allows for long-term data collection and storage but is not optimal for highly time-varying data, such as a collision, traffic light change, etc., and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage, and processing as well as remote cloud data-center-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application Layer data is typically less time-critical and may be stored and processed in a remote cloud data center.

Figure 14:
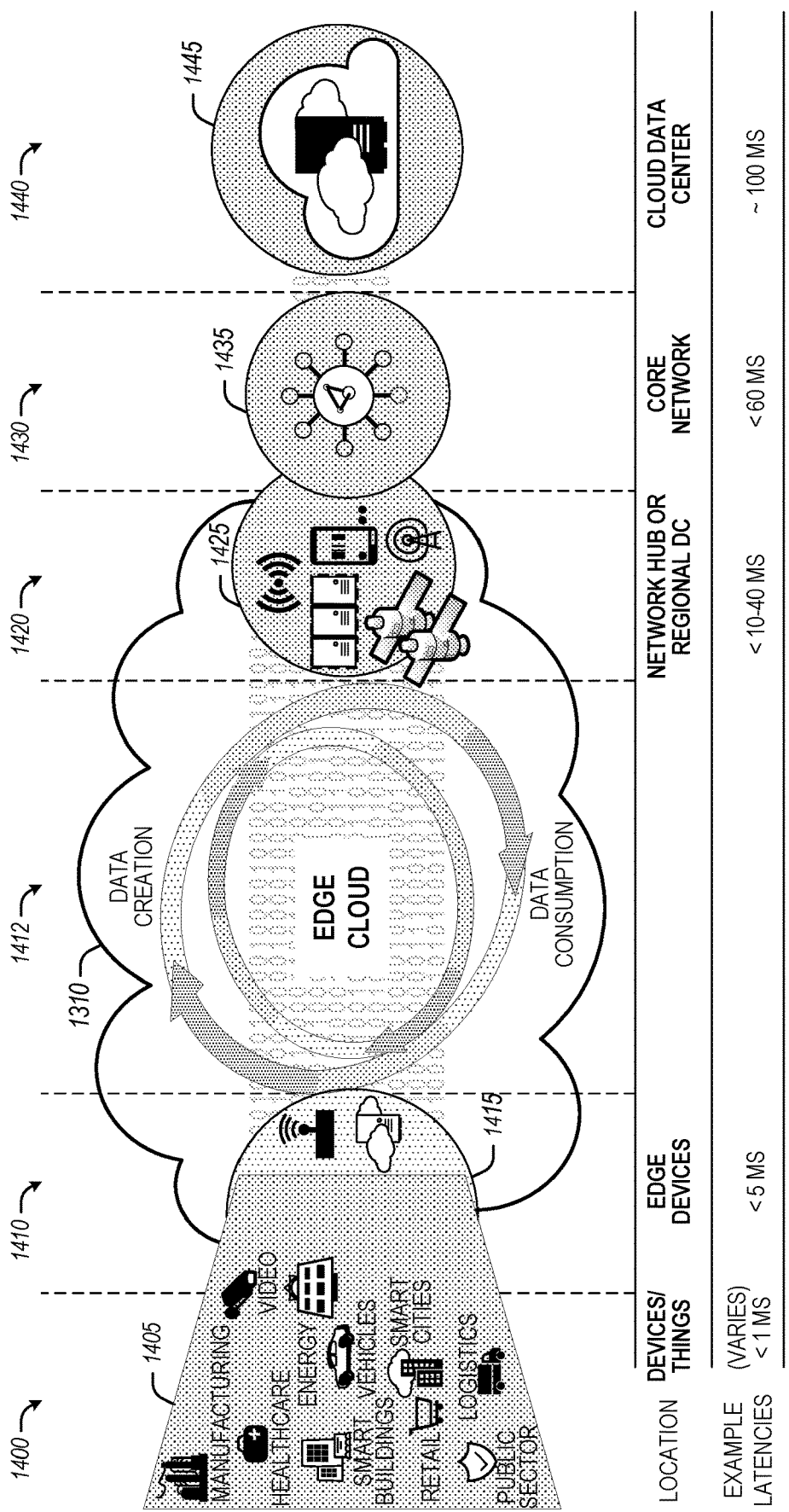
FIG. 14 illustrates an overview of layers of distributed compute deployed among an edge computing system, according to an example.

FIG. 14 illustrates operational layers among endpoints, an edge cloud, and cloud computing environments. Specifically, FIG. 14 depicts examples of computational use cases 1405, utilizing the edge cloud 1310 among multiple illustrative layers of network computing. The layers begin at an endpoint (devices and things) layer 1400, which accesses the edge cloud 1310 to conduct data creation, analysis, and data consumption activities. The edge cloud 1310 may span multiple network layers, such as an edge devices layer 1410 having gateways, on-premise servers, or network equipment (nodes 1415) located in physically proximate edge systems; a network access layer 1420, encompassing base stations, radio processing units, network hubs, regional data centers (DC), or local network equipment (equipment 1425); and any equipment, devices, or nodes located therebetween (in layer 1412, not illustrated in detail). The network communications within the edge cloud 1310 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1400, under 5 ms at the edge devices layer 1410, to even between 10 to 40 ms when communicating with nodes at the network access layer 1420. (Variation to these latencies is expected with the use of non-terrestrial networks). Beyond the edge cloud, 1310 are core network 1430 and cloud data center 1440 layers, each with increasing latency (e.g., between 50-60 ms at the core network layer 1430, to 100 or more ms at the cloud data center layer). As a result, operations at a core network data center 1435 or a cloud data center 1445, with latencies of at least 50 to 100 ms or more, will not be able to accomplish many time-critical functions of the use cases 1405. Each of these latency values is provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1435 or a cloud data center 1445, a central office or content data network may be considered as being located within a "near edge" layer ("near" to the cloud, having high latency values when communicating with the devices and endpoints of the use cases 1405), whereas an access point, base station, on-premise server, or network gateway may be considered as located within a "far edge" layer ("far" from the cloud, having low latency values when communicating with the devices and endpoints of the use cases 1405). It will be understood that other categorizations of a particular network layer as constituting a "close", "local", "near", "middle", or "far" edge may be based on latency, distance, a number of network hops, or other measurable characteristics, as measured from a source in any of the network layers 1400-1440.

The various use cases 1405 may access resources under usage pressure from incoming streams, due to multiple services utilizing the edge cloud. To achieve results with low latency, the services executed within the edge cloud 1310 balance varying requirements in terms of (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1310 may provide the ability to serve and respond to multiple applications of the use cases 1405 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that require connection via satellite, and the additional latency that trips via satellite would require to the cloud.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 1310 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1310 (network layers 1400-1440), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other things capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1310.

As such, the edge cloud 1310 is formed from network components and functional features operated by and within edge gateway nodes, edge aggregation nodes, or other edge compute nodes among network layers 1410-1430. The edge cloud 1310 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 1310 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1310 may be servers, multi-tenant servers, appliance computing devices, and/or any other type of computing device. For example, a node of the edge cloud 1310 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input device such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 16B. The edge cloud 1310 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 15:
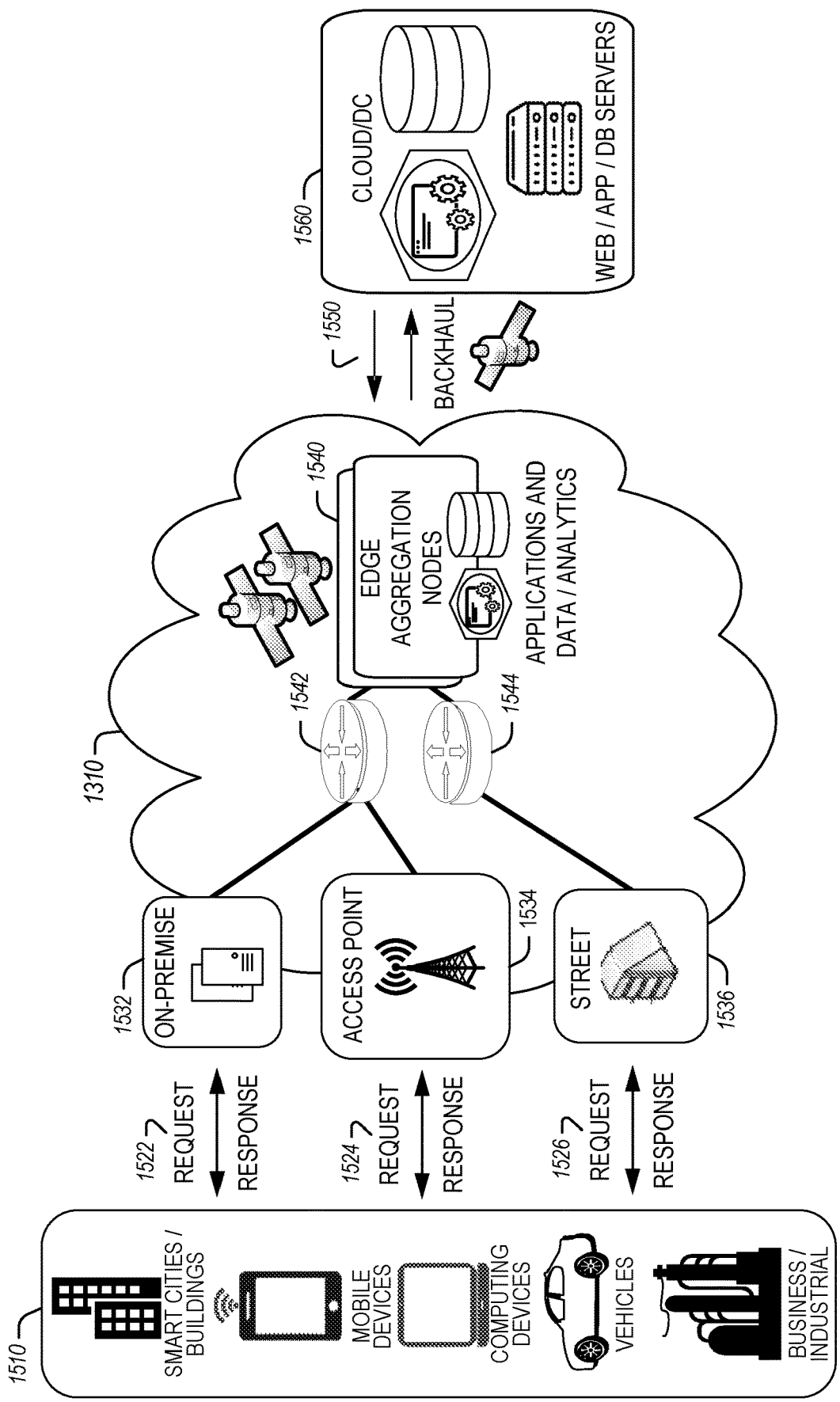
FIG. 15 illustrates operational layers among endpoints, an edge cloud, and cloud computing environments, according to an example.

In FIG. 15, various client endpoints 1510 (in the form of mobile devices, computers, autonomous vehicles, business computing equipment, industrial processing equipment) exchange requests and responses that are specific to the type of endpoint network aggregation. For instance, client endpoints 1510 may obtain network access via a wired broadband network, by exchanging requests and responses 1522 through an on-premise network system 1532. Some client endpoints 1510, such as mobile computing devices, may obtain network access via a wireless broadband network, by exchanging requests and responses 1524 through an access point (e.g., cellular network tower) 1534. Some client endpoints 1510, such as autonomous vehicles may obtain network access for requests and responses 1526 via a wireless vehicular network through a street-located vehicular network system 1536. However, regardless of the type of network access, the TSP may deploy aggregation points 1542, 1544 within the edge cloud 1310 to aggregate traffic and requests. Thus, within the edge cloud 1310, the TSP may deploy various compute and storage resources, such as at edge aggregation nodes 1540 (including those located at satellite vehicles), to provide requested content. The edge aggregation nodes 1540 and other systems of the edge cloud 1310 are connected to a cloud or data center 1560, which uses a backhaul network 1550 (such as a satellite backhaul) to fulfill higher-latency requests from a cloud/data center for websites, applications, database servers, etc. Additional or consolidated instances of the edge aggregation nodes 1540 and the aggregation points 1542, 1544, including those deployed on a single server framework, may also be present within the edge cloud 1310 or other areas of the TSP infrastructure.

At a more generic level, an edge computing system may be described to encompass any number of deployments operating in the edge cloud 1310, which provide coordination from the client and distributed computing devices. FIG. 14 provides a further abstracted overview of layers of distributed compute deployed among an edge computing environment for purposes of illustration.

Figure 16:
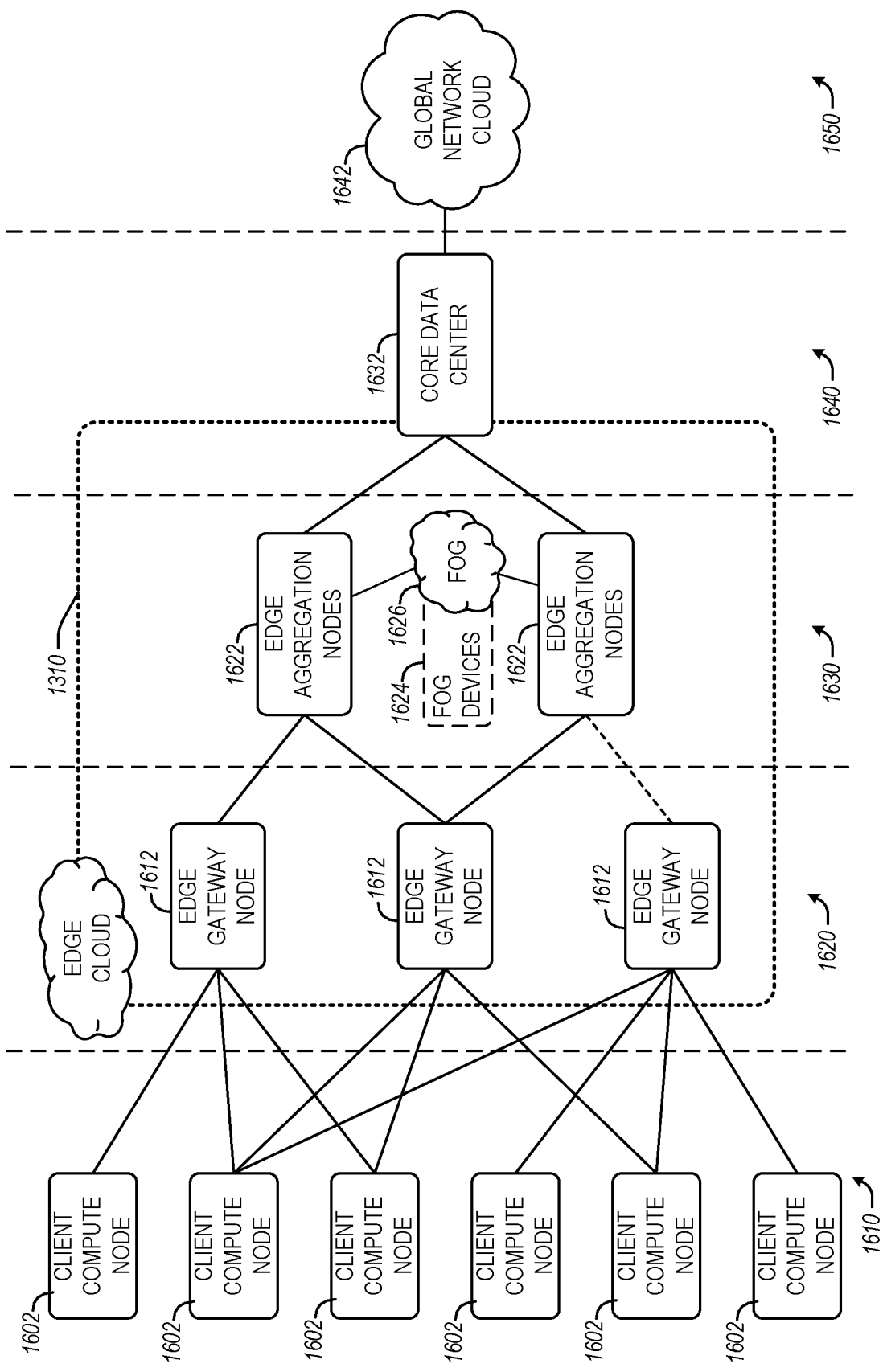
FIG. 16 illustrates an example approach for networking and services in an edge computing system, according to an example.

FIG. 16 generically depicts an edge computing system for providing edge services and applications to multi-stakeholder entities, as distributed among one or more client compute nodes 1602, one or more edge gateway nodes 1612, one or more edge aggregation nodes 1622, one or more core data centers 1632, and a global network cloud 1642, as distributed across layers 1610, 1620, 1630, 1640, and 1650 of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer (of layers 1610, 1620, 1630, 1640, and 1650) corresponding to layers 1400, 1410, 1420, 1430, 1440. For example, the client compute nodes 1602 are each located at an endpoint layer 1410, while each of the edge gateway nodes 1612 are located at an edge devices layer 1420 (local level) of the edge computing system. Additionally, each of the edge aggregation nodes 1622 (and/or fog devices 1624, if arranged or operated with or among a fog networking configuration 1626) are located at a network access layer 1430 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of fog may be integrated into an edge computing architecture.

The core data center 1632 is located at a core network layer 1430 (e.g., a regional or geographically-central level), while the global network cloud 1642 is located at a cloud data center layer 1440 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1632 may be located within, at, or near the edge cloud 1310.

Although an illustrative number of client compute nodes 1602, edge gateway nodes 1612, edge aggregation nodes 1622, core data centers 1632, global network clouds 1642 are shown in FIG. 16, it should be appreciated that the edge computing system may include more or fewer devices or systems at each layer. Additionally, as shown in FIG. 14, the number of components of each layer 1400, 1410, 1420, 1430, 1440 generally increases at each lower level (i.e., when moving closer to endpoints). As such, one edge gateway node 1612 may service multiple client compute nodes 1602, and one edge aggregation node 1622 may service multiple edge gateway nodes 1612.

Consistent with the examples provided herein, each client compute node 1602 may be embodied as any type of end point component, device, appliance, or "thing" capable of communicating as a producer or consumer of data. Further, the label "node" or "device" as used in the edge computing system 1600 does not necessarily mean that such node or device operates in a client or agent/minion/follower role; rather, any of the nodes or devices in the edge computing system 1600 refer to individual entities, nodes, or subsystems which include discrete or connected hardware or software configurations to facilitate or use the edge cloud 1310.

As such, the edge cloud 1310 is formed from network components and functional features operated by and within the edge gateway nodes 1612 and the edge aggregation nodes 1622 of layers 1420, 1430, respectively. The edge cloud 1310 may be embodied as any type of network that provides edge computing and/or storage resources that are proximately located to radio access network (RAN) capable endpoint devices (e.g., mobile computing devices, IoT devices, smart devices, etc.), which are shown in FIG. 14 as the client compute nodes 1602. In other words, the edge cloud 1310 may be envisioned as an "edge" that connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1310 may form a portion of or otherwise provide an ingress point into or across a fog networking configuration 1626 (e.g., a network of fog devices 1624, not shown in detail), which may be embodied as a system-level horizontal and distributed architecture that distributes resources and services to perform a specific function. For instance, a coordinated and distributed network of fog devices 1624 may perform computing, storage, control, or networking aspects in the context of an IoT system arrangement. Other networked, aggregated, and distributed functions may exist in the edge cloud 1310 between the cloud data center layer 1440 and the client endpoints (e.g., client compute nodes 1602). Some of these are discussed in the following sections in the context of network functions or service virtualization, including the use of virtual edges and virtual services which are orchestrated for multiple stakeholders.

The edge gateway nodes 1612 and the edge aggregation nodes 1622 cooperate to provide various edge services and security to the client compute nodes 1602. Furthermore, because each client compute node 1602 may be stationary or mobile, each edge gateway node 1612 may cooperate with other edge gateway devices to propagate presently provided edge services and security as the corresponding client compute node 1602 moves about a region. To do so, each of the edge gateway nodes 1612 and/or edge aggregation nodes 1622 may support multiple tenancies and multiple stakeholder configurations, in which services from (or hosted for) multiple service providers and multiple consumers may be supported and coordinated across a single or multiple compute devices.

In further examples, any of the compute nodes or devices discussed with reference to the present computing systems and environment may be fulfilled based on the components depicted in FIGS. 17A and 17B. Each compute node may be embodied as a type of device, appliance, computer, or other "thing" capable of communicating with other edge, networking, or endpoint components.

Figure 17A:
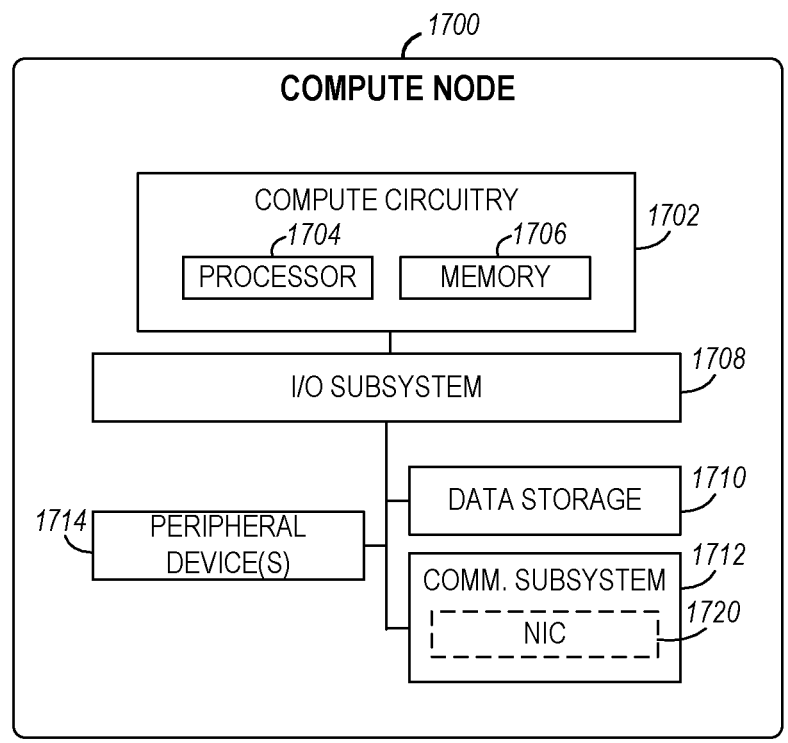
FIG. 17A illustrates an overview of example components deployed at a compute node system, according to an example.

In the simplified example depicted in FIG. 17A, an edge compute node 1700 includes a compute engine (also referred to herein as "compute circuitry") 1702, an input/output (I/O) subsystem 1708, data storage 1710, a communication circuitry subsystem 1712, and, optionally, one or more peripheral devices 1714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1700 may be embodied as any type of engine, device, or collection of devices capable of performing various compute functions. In some examples, the compute node 1700 may be embodied as a single device such as an integrated circuit, an embedded system, a field-programmable gate array (FPGA), a system-on-a-chip (SOC), or other integrated system or device. In the illustrative example, the compute node 1700 includes or is embodied as a processor 1704 and a memory 1706. The processor 1704 may be embodied as any type of processor capable of performing the functions described herein (e.g., executing an application). For example, the processor 1704 may be embodied as a multi-core processor(s), a microcontroller, or other processor or processing/controlling circuit. In some examples, the processor 1704 may be embodied as, include, or be coupled to an FPGA, an application-specific integrated circuit (ASIC), reconfigurable hardware or hardware circuitry, or other specialized hardware to facilitate the performance of the functions described herein.

The main memory 1706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1706 may be integrated into the processor 1704. The main memory 1706 may store various software and data used during operation such as one or more applications, data operated on by the application(s), libraries, and drivers.

The compute circuitry 1702 is communicatively coupled to other components of the compute node 1700 via the I/O subsystem 1708, which may be embodied as circuitry and/or components to facilitate input/output operations with the compute circuitry 1702 (e.g., with the processor 1704 and/or the main memory 1706) and other components of the compute circuitry 1702. For example, the I/O subsystem 1708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1708 may form a portion of a system-on-a-chip (SoC) and be incorporated, along with one or more of the processor 1704, the main memory 1706, and other components of the compute circuitry 1702, into the compute circuitry 1702.

The one or more illustrative data storage devices 1710 may be embodied as any type of devices configured for short-term or long-term storage of data such as, for example, memory devices and circuits, memory cards, hard disk drives, solid-state drives, or other data storage devices. Each data storage device 1710 may include a system partition that stores data and firmware code for the data storage device 1710. Each data storage device 1710 may also include one or more operating system partitions that store data files and executables for operating systems depending on, for example, the type of compute node 1700.

The communication circuitry 1712 may be embodied as any communication circuit, device, or collection thereof, capable of enabling communications over a network between the compute circuitry 1702 and another compute device (e.g., an edge gateway node 1612 of the edge computing system 1400). The communication circuitry 1712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1712 includes a network interface controller (NIC) 1720, which may also be referred to as a host fabric interface (HFI). The NIC 1720 may be embodied as one or more add-in-boards, daughter cards, network interface cards, controller chips, chipsets, or other devices that may be used by the compute node 1700 to connect with another compute device (e.g., an edge gateway node 1612). In some examples, the NIC 1720 may be embodied as part of a system-on-a-chip (SoC) that includes one or more processors or included on a multichip package that also contains one or more processors. In some examples, the NIC 1720 may include a local processor (not shown) and/or a local memory (not shown) that are both local to the NIC 1720. In such examples, the local processor of the NIC 1720 may be capable of performing one or more of the functions of the compute circuitry 1702 described herein. Additionally, the local memory of the NIC 1720 may be integrated into one or more components of the client compute node at the board level, socket level, chip level, and/or other levels.

Additionally, in some examples, each compute node 1700 may include one or more peripheral devices 1714. Such peripheral devices 1714 may include any type of peripheral device found in a compute device or server such as audio input devices, a display, other input/output devices, interface devices, and/or other peripheral devices, depending on the particular type of the compute node 1700. In further examples, the compute node 1700 may be embodied by a respective edge compute node in an edge computing system (e.g., client compute node 1602, edge gateway node 1612, edge aggregation node 1622) or like forms of appliances, computers, subsystems, circuitry, or other components.

Figure 17B:
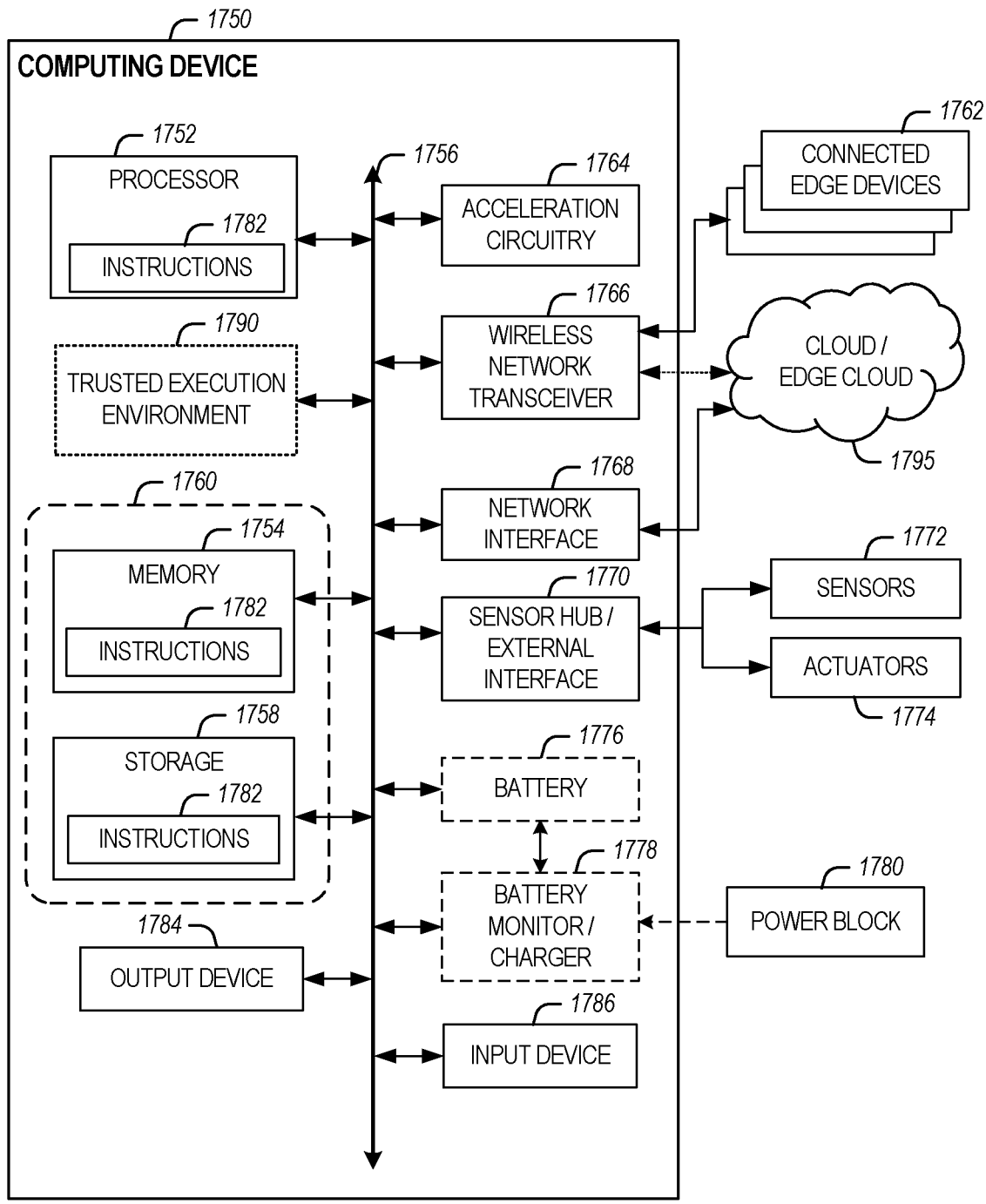
FIG. 17B illustrates a further overview of example components within a computing device, according to an example.

In a more detailed example, FIG. 17B illustrates a block diagram of an example of components that may be present in an edge computing node 1750 for implementing the techniques (e.g., operations, processes, methods, and methodologies) described herein. The edge computing node 1750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1750, or as components otherwise incorporated within a chassis of a larger system. Further, to support the security examples provided herein, a hardware RoT (e.g., provided according to a DICE architecture) may be implemented in each IP block of the edge computing node 1750 such that any IP Block could boot into a mode where a RoT identity could be generated that may attest its identity and its current booted firmware to another IP Block or an external entity.

The edge computing node 1750 may include processing circuitry in the form of a processor 1752, which may be a microprocessor, a multi-core processor, a multithreaded processor, an ultra-low voltage processor, an embedded processor, or other known processing elements. The processor 1752 may be a part of a system on a chip (SoC) in which the processor 1752 and other components are formed into a single integrated circuit, or a single package, such as the Edison™ or Galileo™ SoC boards from Intel Corporation, Santa Clara, California. As an example, the processor 1752 may include an Intel® Architecture Core™ based processor, such as a Quark™, an Atom™, a Xeon™, an i3, an i5, an i7, an i9, or an MCU-class processor, or another such processor available from Intel®. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1752 may communicate with a system memory 1754 over an interconnect 1756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 1758 may also couple to the processor 1752 via the interconnect 1756. In an example, the storage 1758 may be implemented via a solid-state disk drive (SSDD). Other devices that may be used for the storage 1758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such as resistance change memories, phase change memories, holographic memories, or chemical memories, among others.

The components may communicate over the interconnect 1756. The interconnect 1756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1756 may be a proprietary bus, for example, used in an SoC-based system. Other bus systems may be included, such as an I2C interface, an SPI interface, point-to-point interfaces, and a power bus, among others.

The interconnect 1756 may couple the processor 1752 to a transceiver 1766, for communications with the connected edge devices 1762. The transceiver 1766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1762. For example, a wireless local area network (WLAN) unit may be used to implement Wi-Fi® communications in accordance with the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 1766 (or multiple transceivers) may communicate using multiple standards or radios for communications at a different range. For example, the edge computing node 1750 may communicate with close devices, e.g., within about 10 meters, using a local transceiver based on BLE, or another low power radio, to save power. More distant connected edge devices 1762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1766 (e.g., a radio transceiver) may be included to communicate with devices or services in the edge cloud 1795 via local or wide area network protocols. The wireless network transceiver 1766 may be an LPWA transceiver that follows the IEEE 802.15.4, or IEEE 802.15.4g standards, among others. The edge computing node 1750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1766, as described herein. For example, the transceiver 1766 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 1766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1768 may be included to provide a wired communication to nodes of the edge cloud 1795 or other devices, such as the connected edge devices 1762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1768 may be included to enable connecting to a second network, for example, a first NIC 1768 providing communications to the cloud over Ethernet, and a second NIC 1768 providing communications to other devices over another type of network.

Given the variety of types of applicable communications from the device to another component or network, applicable communications circuitry used by the device may include or be embodied by any one or more of components 1764, 1766, 1768, or 1770. Accordingly, in various examples, applicable means for communicating (e.g., receiving, transmitting, etc.) may be embodied by such communications circuitry.

The edge computing node 1750 may include or be coupled to acceleration circuitry 1764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1756 may couple the processor 1752 to a sensor hub or external interface 1770 that is used to connect additional devices or subsystems. The devices may include sensors 1772, such as accelerometers, level sensors, flow sensors, optical light sensors, camera sensors, temperature sensors, global positioning system (GPS) sensors, pressure sensors, barometric pressure sensors, and the like. The hub or interface 1770 further may be used to connect the edge computing node 1750 to actuators 1774, such as power switches, valve actuators, an audible sound generator, a visual warning device, and the like.

In some optional examples, various input/output (I/O) devices may be present within or connected to, the edge computing node 1750. For example, a display or other output device 1784 may be included to show information, such as sensor readings or actuator position. An input device 1786, such as a touch screen or keypad may be included to accept input. An output device 1784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1750.

A battery 1776 may power the edge computing node 1750, although, in examples in which the edge computing node 1750 is mounted in a fixed location, it may have a power supply coupled to an electrical grid. The battery 1776 may be a lithium-ion battery, or a metal-air battery, such as a zinc-air battery, an aluminum-air battery, a lithium-air battery, and the like.

A battery monitor/charger 1778 may be included in the edge computing node 1750 to track the state of charge (SoCh) of the battery 1776. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1778 may communicate the information on the battery 1776 to the processor 1752 over the interconnect 1756. The battery monitor/charger 1778 may also include an analog-to-digital (ADC) converter that enables the processor 1752 to directly monitor the voltage of the battery 1776 or the current flow from the battery 1776. The battery parameters may be used to determine actions that the edge computing node 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the edge computing node 1750. A wireless battery charging circuit, such as an LTC4020 chip from Linear Technologies of Milpitas, California, among others, may be included in the battery monitor/charger 1778. The specific charging circuits may be selected based on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application-specific integrated circuit (ASIC).

In an example, the instructions 1782 provided via the memory 1754, the storage 1758, or the processor 1752 may be embodied as a non-transitory, machine-readable medium 1760 including code to direct the processor 1752 to perform electronic operations in the edge computing node 1750. The processor 1752 may access the non-transitory, machine-readable medium 1760 over the interconnect 1756. For instance, the non-transitory, machine-readable medium 1760 may be embodied by devices described for the storage 1758 or may include specific storage units such as optical disks, flash drives, or any number of other hardware devices. The non-transitory, machine-readable medium 1760 may include instructions to direct the processor 1752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 17A and 17B are intended to depict a high-level view of components of a device, subsystem, or arrangement of an edge computing node. However, it will be understood that some of the components shown may be omitted, additional components may be present, and a different arrangement of the components shown may occur in other implementations.

Figure 18:
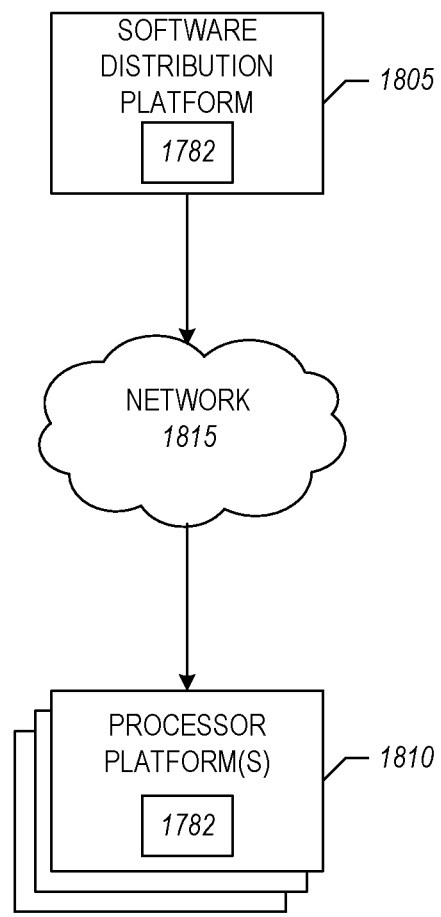
FIG. 18 illustrates a software distribution platform to distribute software instructions and derivatives, according to an example.

FIG. 18 illustrates an example software distribution platform 1805 to distribute software, such as the example computer-readable instructions 1782 of FIG. 17B, to one or more devices, such as processor platform(s) 1810 and/or other example connected edge devices or systems discussed herein. The example software distribution platform 1805 may be implemented by any computer server, data facility, cloud service, etc., capable of storing and transmitting software to other computing devices. Example connected edge devices may be customers, clients, managing devices (e.g., servers), third parties (e.g., customers of an entity owning and/or operating the software distribution platform 1805). Example connected edge devices may operate in commercial and/or home automation environments. In some examples, a third party is a developer, a seller, and/or a licensor of software such as the example computer-readable instructions 1782 of FIG. 17B. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 18, the software distribution platform 1805 includes one or more servers and one or more storage devices that store the computer-readable instructions 1782. The one or more servers of the example software distribution platform 1805 are in communication with a network 1815, which may correspond to any one or more of the Internet and/or any of the example networks described above. In some examples, one or more servers are responsive to requests to transmit the software to a requesting party as part of a commercial transaction. Payment for the delivery, sale, and/or license of the software may be handled by one or more servers of the software distribution platform and/or via a third-party payment entity. The servers enable purchasers and/or licensors to download the computer-readable instructions 1782 from the software distribution platform 1805. For example, the software, which may correspond to example computer-readable instructions, may be downloaded to the example processor platform(s), which is/are to execute the computer-readable instructions 1782. In some examples, one or more servers of the software distribution platform 1805 are communicatively connected to one or more security domains and/or security devices through which requests and transmissions of the example computer-readable instructions 1782 must pass. In some examples, one or more servers of the software distribution platform 1805 periodically offer, transmit, and/or force updates to the software (e.g., the example computer-readable instructions 1782 of FIG. 17B) to ensure improvements, patches, updates, etc. are distributed and applied to the software at the end-user devices.

In the illustrated example of FIG. 18, the computer-readable instructions 1782 are stored on storage devices of the software distribution platform 1805 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 1782 stored in the software distribution platform 1805 are in a first format when transmitted to the example processor platform(s) 1810. In some examples, the first format is an executable binary in which particular types of the processor platform(s) 1810 can execute. However, in some examples, the first format is uncompiled code that requires one or more preparation tasks to transform the first format to a second format to enable execution on the example processor platform(s) 1810. For instance, the receiving processor platform(s) 1800 may need to compile the computer-readable instructions 1782 in the first format to generate executable code in a second format that is capable of being executed on the processor platform(s) 1810. In still other examples, the first format is interpreted code that, upon reaching the processor platform(s) 1810, is interpreted by an interpreter to facilitate the execution of instructions.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a user equipment (UE) of a first autonomous vehicle (AV), comprising: communications circuitry configured to perform vehicle-to-vehicle (V2V) or Vehicle-to-Everything (V2X) network communications with an autonomous vehicle distributed network (AVDN); and processing circuitry configured to: identify a service condition, based on a state of a service and connectivity to an instance of the service in an infrastructure network; establish a connection in the AVDN to a second UE at a second AV in response to the service condition, using the V2V or V2X network communications, the AVDN further to provide connectivity between the UE and the second UE for use of the service; and perform a service operation with the service via the AVDN, using the connection to the second UE.

In Example 2, the subject matter of Example 1 optionally includes subject matter where the AVDN is formed among a plurality of AVs, the AVDN connecting at least the UE of the first AV and the second UE of the second AV.

In Example 3, the subject matter of any one or more of Examples 1-2 optionally include subject matter where the service operation performed by the UE includes providing a service request to the AVDN, wherein the first AV operates as a service requestor, and wherein the second AV operates as a service provider.

In Example 4, the subject matter of any one or more of Examples 1-3 optionally include subject matter where the service operation performed by the UE includes fulfillment of a service request from the AVDN, wherein the first AV operates as a service provider, and wherein the second AV operates as a service requestor.

In Example 5, the subject matter of any one or more of Examples 1-4 optionally include subject matter where the service condition is identified in response to a change of the state of the service, and wherein the change of the state of service is associated with one or more of: availability of data from the service; availability of a resource used by the service; unavailability of the instance of the service in the infrastructure network; or a safety-related scenario involving the first AV, the second AV, or the service.

In Example 6, the subject matter of any one or more of Examples 1-5 optionally include or DSRC wireless network operated from fixed locations.

In Example 7, the subject matter of any one or more of Examples 1-6 optionally include subject matter where the service operation relates to: data sharing, decision sharing, or task computation sharing; and wherein the service operation provides fulfillment of an application operating at the first AV or the second AV.

In Example 8, the subject matter of any one or more of Examples 1-7 optionally include subject matter where the service is provided by a Multi-Access Edge Computing (MEC) host, and wherein the MEC host operates according to a standard from an European Telecommunications Standards Institute (ETSI) MEC standards family.

In Example 9, the subject matter of Example 8 optionally includes subject matter where: the UE operates as a MEC client, and wherein the second UE operates as the MEC host; or the UE operates as the MEC host, and wherein the second UE operates as a MEC client.

In Example 10, the subject matter of any one or more of Examples 1-9 optionally include subject matter where the service operation is established using an Application Programming Interface (API) for the AVDN, the API for the AVDN providing a standardized interface to invoke the service operation between the UE and the second UE.

In Example 11, the subject matter of any one or more of Examples 1-10 optionally include the processing circuitry further configured to: perform authentication of the UE with an authentication server of the AVDN, wherein the connection with the AVDN is established in response to successful authentication.

In Example 12, the subject matter of any one or more of Examples 1-11 optionally include subject matter where the UE is configured by the AVDN to operate as an anchor service provider, wherein the processing circuitry is further configured to: perform a service request with a third UE of a third AV; obtain service response data, in response to the service request with the third UE; and provide the service response data to the second UE.

Example 13 is at least one machine readable medium including instructions for coordinating service operations from a first user equipment (UE) of an autonomous vehicle (AV) with an autonomous vehicle distributed network (AVDN), the instructions, when executed by processing circuitry, to cause the processing circuitry to perform operations comprising: identify a service condition, based on a state of a service and connectivity to an instance of the service in an infrastructure network; establish a connection in the AVDN to a second UE at a second AV in response to the service condition, using vehicle-to-vehicle (V2V) or Vehicle-to-Everything (V2X) network communications to the AVDN, the AVDN further to provide connectivity between the UE and the second UE for use of the service; and perform a service operation with the service via the AVDN, using the connection to the second UE.

In Example 14, the subject matter of Example 13 optionally includes subject matter where the AVDN is formed among a plurality of AVs, the AVDN connecting at least the UE of the first AV and the second UE of the second AV.

In Example 15, the subject matter of any one or more of Examples 13-14 optionally include subject matter where the service operation performed by the UE includes providing a service request to the AVDN, wherein the first AV operates as a service requestor, and wherein the second AV operates as a service provider.

In Example 16, the subject matter of any one or more of Examples 13-15 optionally include subject matter where the service operation performed by the UE is a fulfillment of a service request from the AVDN, wherein the first AV operates as a service provider, and wherein the second AV operates as a service requestor.

In Example 17, the subject matter of any one or more of Examples 13-16 optionally include subject matter where the service condition is identified in response to a change of the state of the service, and wherein the change of the state of service is associated with one or more of: availability of data from the service; availability of a resource used by the service; unavailability of the instance of the service in the infrastructure network; or a safety-related scenario involving the first AV, the second AV, or the service.

In Example 18, the subject matter of any one or more of Examples 13-17 optionally include or DSRC wireless network operated from fixed locations.

In Example 19, the subject matter of any one or more of Examples 13-18 optionally include subject matter where the service operation relates to: data sharing, decision sharing, or task computation sharing; and wherein the service operation provides fulfillment of an application operating at the first AV or the second AV.

In Example 20, the subject matter of any one or more of Examples 13-19 optionally include subject matter where the service is provided by a Multi-Access Edge Computing (MEC) host, and wherein the MEC host operates according to a standard from an European Telecommunications Standards Institute (ETSI) MEC standards family.

In Example 21, the subject matter of Example 20 optionally includes subject matter where: the UE operates as a MEC client, and wherein the second UE operates as the MEC host; or the UE operates as the MEC host, and wherein the second UE operates as a MEC client.

In Example 22, the subject matter of any one or more of Examples 13-21 optionally include subject matter where the service operation is established using an Application Programming Interface (API) for the AVDN, the API for the AVDN providing a defined interface to invoke the service operation between the UE and the second UE.

In Example 23, the subject matter of any one or more of Examples 13-22 optionally include the instructions further to perform operations comprising: performing authentication of the UE with an authentication server of the AVDN, wherein the connection with the AVDN is established in response to successful authentication.

In Example 24, the subject matter of any one or more of Examples 13-23 optionally include subject matter where the UE is configured by the AVDN to operate as an anchor service provider, the instructions further to perform operations comprising: performing a service request with a third UE of a third AV; obtaining service response data, in response to the service request with the third UE; and providing the service response data to the second UE.

Example 25 is a method for coordinating service operations from a first user equipment (UE) of an autonomous vehicle (AV) with an autonomous vehicle distributed network (AVDN), comprising: identifying a service condition, based on a state of a service and connectivity to an instance of the service in an infrastructure network; establishing a connection in the AVDN to a second UE at a second AV in response to the service condition, using vehicle-to-vehicle (V2V) or Vehicle-to-Everything (V2X) network communications to the AVDN, the AVDN further to provide connectivity between the UE and the second UE for use of the service; and performing a service operation with the service via the AVDN, using the connection to the second UE.

In Example 26, the subject matter of Example 25 optionally includes subject matter where the AVDN is formed among a plurality of AVs, the AVDN connecting at least the UE of the first AV and the second UE of the second AV.

In Example 27, the subject matter of any one or more of Examples 25-26 optionally include subject matter where the service operation performed by the UE includes providing a service request to the AVDN, wherein the first AV operates as a service requestor, and wherein the second AV operates as a service provider.

In Example 28, the subject matter of any one or more of Examples 25-27 optionally include subject matter where the service operation performed by the UE includes fulfillment of a service request from the AVDN, wherein the first AV operates as a service provider, and wherein the second AV operates as a service requestor.

In Example 29, the subject matter of any one or more of Examples 25-28 optionally include subject matter where the service operation performed by the UE is a fulfillment of a service request from the AVDN, wherein the first AV operates as a service provider, and wherein the second AV operates as a service requestor.

In Example 30, the subject matter of any one or more of Examples 25-29 optionally include subject matter where the service condition is identified in response to a change of the state of the service, and wherein the change of the state of service is associated with one or more of: availability of data from the service; availability of a resource used by the service; unavailability of the instance of the service in the infrastructure network; or a safety-related scenario involving the first AV, the second AV, or the service.

In Example 31, the subject matter of any one or more of Examples 25-30 optionally include or DSRC wireless network operated from fixed locations.

In Example 32, the subject matter of any one or more of Examples 25-31 optionally include subject matter where the service operation relates to: data sharing, decision sharing, or task computation sharing; and wherein the service operation provides fulfillment of an application operating at the first AV or the second AV.

In Example 33, the subject matter of any one or more of Examples 25-32 optionally include subject matter where the service is provided by a Multi-Access Edge Computing (MEC) host, and wherein the MEC host operates according to a standard from an European Telecommunications Standards Institute (ETSI) MEC standards family.

In Example 34, the subject matter of Example 33 optionally includes subject matter where: the UE operates as a MEC client, and wherein the second UE operates as the MEC host; or the UE operates as the MEC host, and wherein the second UE operates as a MEC client.

In Example 35, the subject matter of any one or more of Examples 25-34 optionally include subject matter where the service operation is established using an Application Programming Interface (API) for the AVDN, the API for the AVDN providing a defined interface to invoke the service operation between the UE and the second UE.

In Example 36, the subject matter of any one or more of Examples 25-35 optionally include performing authentication of the UE with an authentication server of the AVDN, wherein the connection with the AVDN is established in response to successful authentication.

Example 37 is a system (e.g., a AVDN system, or an entity of an AVDN system), comprising: at least one network communication device adapted to perform vehicle-to-vehicle (V2V) or Vehicle-to-Everything (V2X) network communications; and at least one processing device that, when in operation, is configured by instructions to: operate the network communication device to establish an autonomous vehicle distributed network (AVDN), using the V2V or V2X network communications; receive a service request via the AVDN, the AVDN further to provide connectivity between the at least one processing device and at least one other device to operate at least one service; identify a service condition based on the service request; and perform a service operation with the at least one service, via the AVDN, based on the identified service condition.

In Example 38, the subject matter of Example 37 optionally includes subject matter where the at least one network communication device and the at least one processing device is included in a first autonomous vehicle (AV), wherein the service operation includes providing a service request to at least a second AV accessible via the AVDN, wherein the first AV operates as a service requestor, and wherein the second AV operates as a service provider.

In Example 39, the subject matter of Example 37 optionally includes subject matter where the at least one network communication device and the at least one processing device is included in a first autonomous vehicle (AV), wherein the service operation includes fulfillment of a service request from at least a second AV accessible via the AVDN, wherein the first AV operates as a service provider, and wherein the second AV operates as a service requestor.

Example 40 is a device, comprising: processing circuitry; and a memory device including instructions embodied thereon, wherein the instructions, which when executed by the processing circuitry, configure the processing circuitry for implementing a multi-access edge computing (MEC) based system to realize MEC V2X and AVDN functions in a MEC infrastructure in accordance with any of Examples 1-39.

Example 41 is an apparatus, comprising a plurality of means, including for implementing a multi-access edge computing (MEC) based system to realize MEC V2X and AVDN functions in a MEC infrastructure in accordance any of Examples 1-39.

Example 42 is a multi-access edge computing (MEC) device, configured as a server, gateway, orchestrator, platform manager, client, or intermediary according to a MEC specification, comprising means to implement the MEC V2X and AVDN functions in a MEC infrastructure in accordance with any of Examples 1-39.

Example 43 is a system comprising respective components arranged or configured to perform any of Examples 1-39.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A user equipment (UE) of a first autonomous vehicle (AV), comprising:
   a network interface configured to perform vehicle-to-vehicle (V2V) or Vehicle-to-Everything (V2X) network communications with an autonomous vehicle distributed network (AVDN); and
   at least one processor configured to:
      identify a service condition based on a state of a service and connectivity to an instance of the service in an infrastructure network;
      establish a connection in the AVDN to a second UE at a second AV in response to the service condition, using the V2V or V2X network communications, the AVDN further to provide connectivity between the UE and the second UE for use of the service; and
      perform a service operation with the service via the AVDN, using the connection to the second UE.

2. The UE of claim 1, wherein the AVDN is formed among a plurality of AVs, the AVDN connecting at least the UE of the first AV and the second UE of the second AV.

3. The UE of claim 1, wherein the service operation performed by the UE includes providing a service request to the AVDN, wherein the first AV operates as a service requestor, and wherein the second AV operates as a service provider.

4. The UE of claim 1, wherein the service operation performed by the UE includes fulfillment of a service request from the AVDN, wherein the first AV operates as a service provider, and wherein the second AV operates as a service requestor.

5. The UE of claim 1, wherein the service condition is identified in response to a change of the state of the service, and wherein the change of the state of service is associated with one or more of:
   availability of data from the service;
   availability of a resource used by the service;
   unavailability of the instance of the service in the infrastructure network; or
   a safety-related scenario involving the first AV, the second AV, or the service.

6. The UE of claim 1, wherein the service condition is identified in response to the UE being located outside a coverage area of the infrastructure network, and wherein the infrastructure network is a wireless network operated from one or more fixed locations and operated in accordance with a standard from a 3rd Generation Partnership Project (3GPP) 5G, Intelligent Transport Systems (ITS)-G5, or Dedicated Short Range Communications (DSRC) family of standards.

7. The UE of claim 1, wherein the service operation relates to: data sharing, decision sharing, or task computation sharing; and
   wherein the service operation provides fulfillment of an application operating at the first AV or the second AV.

8. The UE of claim 1, wherein the service is provided by a Multi-Access Edge Computing (MEC) host,
   wherein the MEC host operates according to a standard from an European Telecommunications Standards Institute (ETSI) MEC standards family, and
   wherein (i) the UE operates as a MEC client and the second UE operates as the MEC host, or (ii) the UE operates as the MEC host and the second UE operates as a MEC client.

9. The UE of claim 1, wherein the service operation is established using an Application Programming Interface (API) for the AVDN, the API for the AVDN providing a standardized interface to invoke the service operation between the UE and the second UE.

10. The UE of claim 1, the at least one processor further configured to:
    perform authentication of the UE with an authentication server of the AVDN, wherein the connection with the AVDN is established in response to successful authentication.

11. The UE of claim 1, wherein the UE is configured by the AVDN to operate as an anchor service provider, wherein the at least one processor is further configured to:
    perform a service request with a third UE of a third AV;
    obtain service response data, in response to the service request with the third UE; and
    provide the service response data to the second UE.

12. At least one non-transitory machine readable medium including instructions for coordinating service operations from a first user equipment (UE) of an autonomous vehicle (AV) with an autonomous vehicle distributed network (AVDN), wherein the instructions, when executed by processing circuitry, cause the processing circuitry to perform operations comprising:
    identify a service condition, based on a state of a service and connectivity to an instance of the service in an infrastructure network;
    establish a connection in the AVDN to a second UE at a second AV in response to the service condition, using vehicle-to-vehicle (V2V) or Vehicle-to-Everything (V2X) network communications to the AVDN, the AVDN further to provide connectivity between the UE and the second UE for use of the service; and
    perform a service operation with the service via the AVDN, using the connection to the second UE.

13. The non-transitory machine readable medium of claim 12, wherein the AVDN is formed among a plurality of AVs, the AVDN connecting at least the UE of the first AV and the second UE of the second AV.

14. The non-transitory machine readable medium of claim 12, wherein the service operation performed by the UE includes providing a service request to the AVDN, wherein the first AV operates as a service requestor, and wherein the second AV operates as a service provider.

15. The non-transitory machine readable medium of claim 12, wherein the service operation performed by the UE includes fulfillment of a service request from the AVDN, wherein the first AV operates as a service provider, and wherein the second AV operates as a service requestor.

16. The non-transitory machine readable medium of claim 12, wherein the service condition is identified in response to a change of the state of the service, and wherein the change of the state of service is associated with one or more of:
   availability of data from the service;
   availability of a resource used by the service;
   unavailability of the instance of the service in the infrastructure network; or
   a safety-related scenario involving the first AV, the second AV, or the service.

17. The non-transitory machine readable medium of claim 12, wherein the service condition is identified in response to the UE being located outside a coverage area of the infrastructure network, and wherein the infrastructure network is a wireless network operated from one or more fixed locations and operated in accordance with a standard from a 3rd Generation Partnership Project (3GPP) 5G, Intelligent Transport Systems (ITS)-G5, or Dedicated Short Range Communications (DSRC) family of standards.

18. The non-transitory machine readable medium of claim 12, wherein the service operation relates to: data sharing, decision sharing, or task computation sharing; and
   wherein the service operation provides fulfillment of an application operating at the first AV or the second AV.

19. The non-transitory machine readable medium of claim 12, wherein the service is provided by a Multi-Access Edge Computing (MEC) host,
   wherein the MEC host operates according to a standard from an European Telecommunications Standards Institute (ETSI) MEC standards family, and
   wherein (i) the UE operates as a MEC client and the second UE operates as the MEC host, or (ii) the UE operates as the MEC host and the second UE operates as a MEC client.

20. The non-transitory machine readable medium of claim 12, wherein the service operation is established using an Application Programming Interface (API) for the AVDN, the API for the AVDN providing a defined interface to invoke the service operation between the UE and the second UE.

21. The non-transitory machine readable medium of claim 12, the instructions further to perform operations comprising:
   performing authentication of the UE with an authentication server of the AVDN, wherein the connection with the AVDN is established in response to successful authentication.

22. The non-transitory machine readable medium of claim 12, wherein the UE is configured by the AVDN to operate as an anchor service provider, the instructions further to perform operations comprising:
   performing a service request with a third UE of a third AV;
   obtaining service response data, in response to the service request with the third UE; and
   providing the service response data to the second UE.

23. A system, comprising:
   at least one network communication device adapted to perform vehicle-to-vehicle (V2V) or Vehicle-to-Everything (V2X) network communications; and
   at least one processing device that, when in operation, is configured by instructions to:
      operate the at least one network communication device to establish an autonomous vehicle distributed network (AVDN), using the V2V or V2X network communications;
      receive a service request via the AVDN, the AVDN further to provide connectivity between the at least one processing device and at least one other device to operate at least one service;
      identify a service condition based on the service request; and
      perform a service operation with the at least one service, via the AVDN, based on the identified service condition.

24. The system of claim 23, wherein the at least one network communication device and the at least one processing device is included in a first autonomous vehicle (AV), wherein the service operation includes providing a service request to at least a second AV accessible via the AVDN, wherein the first AV operates as a service requestor, and wherein the second AV operates as a service provider.

25. The system of claim 23, wherein the at least one network communication device and the at least one processing device is included in a first autonomous vehicle (AV), wherein the service operation includes fulfillment of a service request from at least a second AV accessible via the AVDN, wherein the first AV operates as a service provider, and wherein the second AV operates as a service requestor.

* * * * *